(12) United States Patent
Miller

(10) Patent No.: US 11,669,848 B1
(45) Date of Patent: Jun. 6, 2023

(54) SYSTEM AND METHOD FOR ACCURATE PREDICTIONS USING A PREDICTIVE MODEL

(71) Applicant: RAADZ INC., Louisville, KY (US)

(72) Inventor: Matthew Clark Miller, Louisville, KY (US)

(73) Assignee: RAADZ INC., Louisville, KY (US)

( * ) Notice: Subject to any disclaimer, the term of this patent is extended or adjusted under 35 U.S.C. 154(b) by 0 days.

(21) Appl. No.: 17/727,695

(22) Filed: Apr. 22, 2022

(51) Int. Cl.
*G06Q 30/0203* (2023.01)
*G06Q 10/0637* (2023.01)

(52) U.S. Cl.
CPC ... *G06Q 30/0203* (2013.01); *G06Q 10/06375* (2013.01)

(58) Field of Classification Search
CPC ......... G06Q 10/06375; G06Q 30/0203; G06N 3/08; G06N 7/005
USPC ...................................... 705/7.31
See application file for complete search history.

(56) References Cited

U.S. PATENT DOCUMENTS

| | | | |
|---|---|---|---|
| 5,916,024 | A | 6/1999 | Von Kohorn |
| 6,529,878 | B2 | 3/2003 | De Rafael et al. |
| 8,554,601 | B1 | 10/2013 | Marsh |
| 8,639,573 | B2 | 1/2014 | Wilen |
| 2002/0120504 | A1 | 8/2002 | Gould et al. |
| 2005/0075923 | A1* | 4/2005 | Kolsky ............ G06Q 10/06395 705/7.41 |
| 2006/0224452 | A1 | 10/2006 | Ng |
| 2007/0290878 | A1 | 12/2007 | Maggio |
| 2008/0021783 | A1 | 1/2008 | Verghese |
| 2008/0033790 | A1 | 2/2008 | Nickerson |
| 2008/0195460 | A1 | 8/2008 | Varghese |
| 2008/0196060 | A1 | 8/2008 | Varghese |
| 2010/0022861 | A1 | 1/2010 | Cinbis et al. |
| 2010/0131356 | A1 | 5/2010 | Stevens |
| 2010/0306028 | A1* | 12/2010 | Wagner .................. G06Q 30/02 705/7.32 |
| 2013/0041840 | A1 | 2/2013 | Gross |

(Continued)

OTHER PUBLICATIONS

"Analysis and Accurate Prediction of User's Response Behavior in Incentive-Based Demand Response", Liu et al., Jan. 11, 2019 (Year: 2019).*

*Primary Examiner* — Charles Guiliano
*Assistant Examiner* — Po Han Lee
(74) *Attorney, Agent, or Firm* — Hollowell Patent Group; Kelly Hollowell

(57) ABSTRACT

Presenting a content item and a question from an inquirer to a group of users in a first feedback session with a requirement for the users to provide predictions of how a member of a distinct target group will respond to the content item in the future, receiving, during the first feedback session, the first group's prediction of the target group's future responses, presenting, during a second feedback session, the same content item and the same question to the target group with a requirement for the target group to provide responses directed to their own responses, constructing a predictive model of the target group based on responses received from the target group during the second feedback session, measuring accuracy of the first group's prediction using the target group predictive model, and providing inquirer access to the predictive model of the target group and the most accurate prediction.

17 Claims, 10 Drawing Sheets

(56) References Cited

U.S. PATENT DOCUMENTS

| | | | |
|---|---|---|---|
| 2013/0151332 A1* | 6/2013 | Yan | G06Q 30/0243 |
| | | | 705/14.42 |
| 2014/0257931 A1 | 9/2014 | Rinzler | |
| 2014/0304654 A1* | 10/2014 | Gross | G06F 3/0482 |
| | | | 715/811 |
| 2014/0304657 A1 | 10/2014 | Biswas | |
| 2015/0213483 A1 | 7/2015 | Mallon | |
| 2017/0287348 A1 | 10/2017 | Mosher | |
| 2018/0373991 A1 | 12/2018 | Rosenberg | |
| 2021/0004485 A1* | 1/2021 | Summers | G06F 40/284 |
| 2021/0326674 A1* | 10/2021 | Liu | G06N 3/04 |

\* cited by examiner

≡ Welcome Matt   Balance: 1033.22 ⊙
Company:  [Raadz Inc.] [Save]
Select Ad Type:   Video   Image   Audio

---

Company Name:  Raadz Inc.
Ad Title:  [          ]
More Info Link:  [          ]
Select Image File:  [Choose File]  No file selected

---

Select FOUR (4) Questions for feedback:
☐ How well does the ad explain the product?
☐ How funny will the typical person find this ad?
☐ How emotional will the typical person find this ad?
☐ How offensive will the typical person find this ad?
☐ How attention-grabbing is this ad for the typical person?
☐ Overall effectiveness of this ad?
☐ Predicted effectiveness of seeing this ad again?
☐ Ability for this ad to go viral?
☐ Chance of increased business because of this ad?

---

Gender Targeting? ⦿ No
○ Male   ○ Female
Age Targeting? ⦿ No
☐ <18  ☐ 18-25  ☐ 26-40  ☐ 41-60  ☐ 61+
Location Targeting? [No ▾]
User Interest Targeting? ⦿ No
☐ Music            ☐ Electronics         ☐ Cars       ☐ Movies & TV Shows
☐ Home Improvement ☐ Clothing & Apparel  ☐ Books      ☐ Beauty & Personal Care
☐ Video Games      ☐ Pets                ☐ Sports     ☐ Outdoor Activities
☐ Nightlife        ☐ Travel                           ☐ Charities  ☐ Restaurants & Food

---

Select number of views:

| 20 | 30 | 50 | 75 | 100 |
|----|----|----|----|-----|
| $0.070 | $0.065 | $0.060 | $0.055 | $0.050 |

---

☐ Receive email list of targeted users that opt in. ($0.030 per view)
The list can also be purchased after ad completion for a higher per user price.
Promo Code: [   ] [Apply]
Total Cost:  $5.00
[Preview]

FIG. 6

SYSTEM AND METHOD FOR ACCURATE PREDICTIONS USING A PREDICTIVE MODEL

TECHNICAL FIELD

The present disclosure relates generally to selecting accurate predictions using a predictive model and providing access to the selected predictions and the predictive model for generating predictive analytic output.

BACKGROUND

Content items such as advertisements, video, images, or songs can be seen and heard everywhere. For instance, images, songs, videos, and advertisements can be online or on television, websites, radio, billboards, sports arenas, etc. Generally, content presenters spend billions of dollars annually on the content items they present. However, frequently these content items go unnoticed or unviewed. Many individuals may change the channel or station, switch their attention to something else, close out of pop-up ads, etc. instead of viewing the content. Because the audience may not be paying attention, content items may not effectively be reaching their intended audience.

Further, an organization or individual may desire feedback from viewers who do view their content. Such an organization or individual desiring feedback concerning their content may request viewers for feedback. However, users may not want to participate in telephone surveys, mail surveys, or online surveys as they may be time consuming, and require individuals to mail documents. Or, if the users do participate in the surveys, they may give rushed answers to complete the survey as quickly as possible. Often, rushed answers do not provide an accurate representation of the viewers' opinion regarding an advertisement.

Likewise, parties other than advertisers may desire feedback from the public regarding a variety of items. For example, a company may want to conduct market research on a new product design. Or, a company may be considering changing its logo and want feedback on which logo will best resonate with individuals. In another example, a company or organization may want thoughtful feedback on the quality of service they provide to individuals. An individual or organization desiring thoughtful feedback concerning content or service they provide may be referred to as an inquirer. An inquirer may be, for example, an advertiser, social media influencer, pollster, or politician.

SUMMARY

An exemplary implementation in accordance with the present disclosure may comprise presenting a content item from an inquirer to a predicting group comprising users in a first feedback session, said content item comprising at least one question directed to the users' responses to the content and a request for each user to provide predictions of how a member of a distinct responding target group will respond to the content item if members of the target group were presented the content item in the future, receiving, during the first feedback session, the first group's predictions of the target group's future responses, presenting, during a second feedback session, the same content item and the same at least one question about the content item to the target group with a request for the target group to provide responses directed to their own responses, receiving, during the second feedback session, the target group's responses directed to their own responses, constructing a predictive model of the target group comprising a comparison value determined using only the responses received from the target group during the second feedback session, using the predictive model of the target group to measure accuracy of the first group's predictions received during the first feedback session, and providing inquirer access to the predictive model of the target group and at least a portion of the most accurate of the first group's predictions, for measuring content item effect based on the predictive analytics directed to the at least one question during the first and second feedback sessions and to the predictions during the first feedback session.

Various implementations may comprise a system, method, and apparatus configured to select and sort users that respond to content items. The disclosed system, method, and apparatus encourages individuals to respond to content items by allowing users to easily access content items and provide responses using a website, web application, or mobile app. For example, the disclosed system, method, and apparatus may encourage individuals to view content items and participate in questioning regarding the viewed content items. The disclosed system, method, and apparatus may also select the most thoughtful responses to questions regarding the content items and provide a content inquirer with access to the most thoughtful responses and a predictive model of the responding target group.

In one implementation, a method of selecting the most thoughtful responses to questions concerning content items includes causing, via a processor, a content item to be presented at a number of user devices to a number of users during a feedback session. The method then includes receiving, via the user devices, a response from each of the number of users in response to a query included in or regarding the item. A response may comprise an answer. A response may comprise an answer value. An answer may comprise an answer value. As used herein the terms "response," "answer," and "answer value" are interchangeable and synonymous. A response may be a response directed to a user's own response to a question concerning content. A response may be a prediction directed to the user's prediction of how a member of a distinct target group might respond to the question concerning the content, in the future. The response may comprise a numeric, alphabetic, or alphanumeric, response. The response may comprise an input to a graphical user interface coupled with a processor. A predictive model comprising a comparison value is then constructed, via the processor, for the responses from the number of users. The response from the number of users may comprise answer values. A deviation value is then determined, via the processor using the predictive model for each of the users, between the respective answer value for each user and the comparison value. The predictive model may further comprise a plurality of deviation values. The predictive model may be used by an inquirer for predictions of content item effectiveness based on classification, regression analysis, or other analytic techniques known in the art such as classification and regression trees (CART). The method then includes sorting, via the processor, the number of users based on their respective deviation values such that a lower position in the sorted list of deviation values corresponds to a lower deviation value and selecting at least one user associated with a lower position in the sorted list of deviation values as a user that provided a more thoughtful response, via the processor.

In another implementation, an apparatus is provided for selecting users that responded most thoughtfully to questions regarding content items including a processor and a memory storing instructions which, when executed by the processor, cause the processor to cause a content item to be presented at a number of user devices to a number of users during a feedback session. The instructions may then cause the processor to receive, via the user devices, a response comprising an answer value from each of the number of users in response to a query comprising at least one question included in or regarding the item. The instructions may then cause the processor to construct a predictive model comprising a comparison value and deviation values for the responses from the number of users. The processor then determines, for each of the users, the deviation values between the respective answer value for each user and the comparison value, using the comparison value. The instructions then cause the processor to sort the number of users based on their respective deviation values such that a lower position in the sorted list of deviation values corresponds to a lower deviation value, and to select at least one response from a user associated with a lower position in the sorted list of deviation values as a more thoughtful response.

The advantages discussed herein may be found in one, or some, and perhaps not all of the embodiments disclosed herein. Additional features and advantages are described herein, and will be apparent from the following Detailed Description and the figures.

BRIEF DESCRIPTION OF THE DRAWINGS

FIG. 6 is an example inquirer platform interface for selecting users and configuring content items and questions regarding the content items to be presented to the selected users, according to one aspect of the present disclosure.

DETAILED DESCRIPTION

Figure 1:
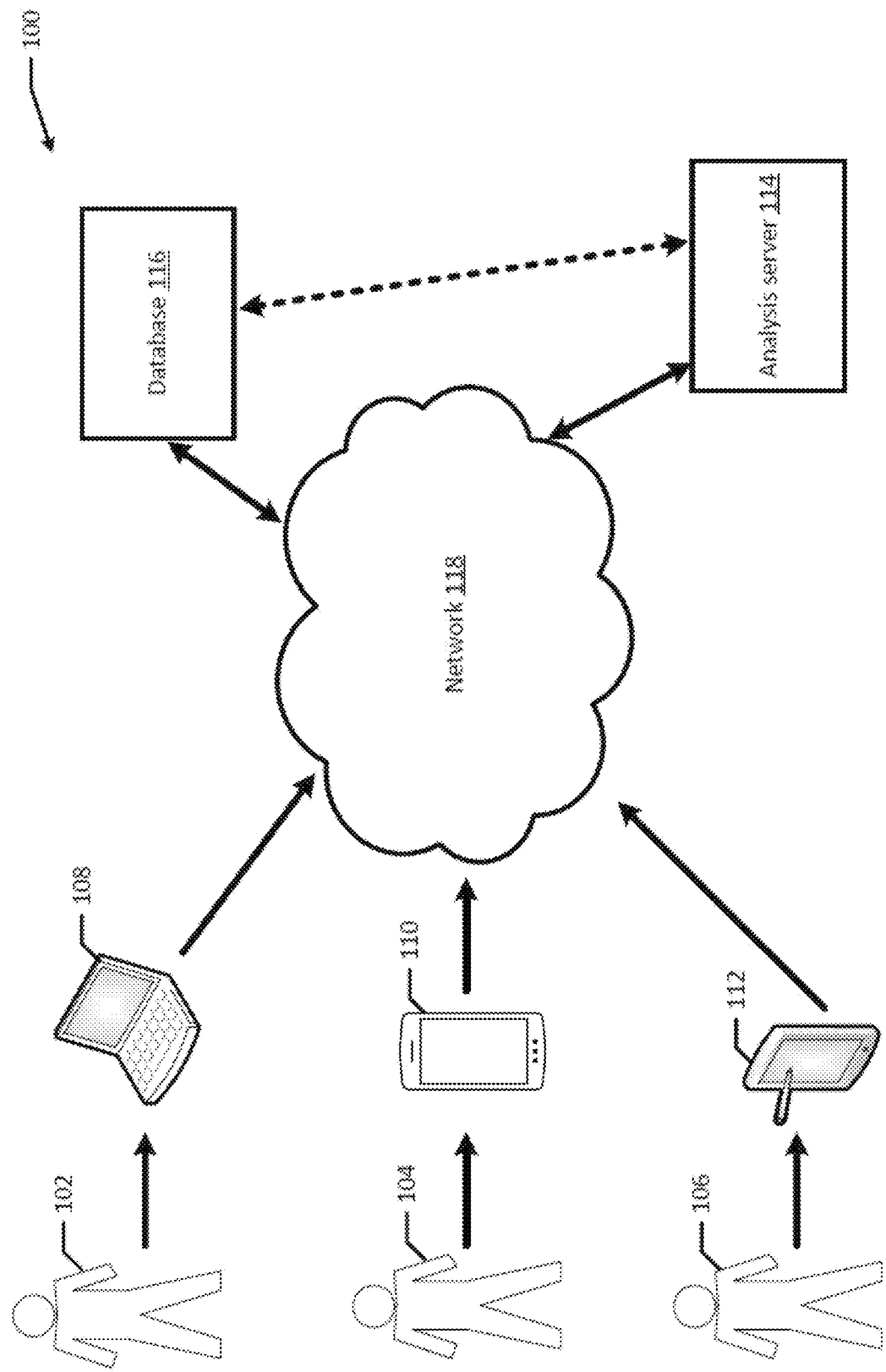
FIG. 1 illustrates an example diagram of a system for evaluating responses from users that view content items, according to one aspect of the present disclosure.

The present disclosure relates in general to a method, system, and apparatus configured to identify users that provide the most thoughtful responses to questions regarding content items. While the disclosure discusses a single operator of a web platform to enable the viewing and answering of questions/queries relating to content items, the example method, system, and apparatus disclosed herein enables multiple entities, operators, managers, etc. to view/track/upload/manage/sell space on the web platform for obtaining feedback regarding content. Further, while the disclosure discusses a single web platform to enable the viewing and answering of questions/queries relating to advertisements, the example method, system, and apparatus disclosed herein may be implemented on multiple web platforms to enable the viewing and responding to questions relating to content items. The example method, system, and apparatus may be used for virtually any type of content item a party desires a review of, such as an advertisement. The presently disclosed method, system, and apparatus may be used with virtually any type of advertisement, for example, billboards, television ads, radio ads, newspaper and magazine ads, internet ads, pop-up ads, direct mail advertising, posters, displays, signs, banner ads, etc.

It should be understood that while the presently disclosed method, system, and apparatus may be described using examples concerning advertisements, an implementation according to the present disclosure may be used for various content items that an inquirer may wish to receive thoughtful reviews for. For example, an inquirer may wish to conduct a market review for a new product design and may present different alternative designs to the public in a survey format. In another example, a company may be considering changing its logo and may seek feedback from the public. In another example still, a company or organization may want thoughtful feedback on the service it provided to a group of individuals. It should be appreciated that these are merely examples, and there are many more instances in which an inquirer may want to issue questions and evaluate the thoughtfulness of answers in response. Additionally, it should be appreciated that the described advantages herein of the disclosed system, method, and apparatus for inquirers can be correlated with the other described uses of the disclosed system, method, and apparatus.

Answering survey questions, if properly contemplated and truthfully answered, may often be time consuming and test the patience of participants in surveys and studies. However, these surveys, questionnaires, and focus groups may be invaluable to inquirers such as advertisers in developing advertisements or selecting which advertisements or elements of advertisements to use. Focus groups also provide important feedback on released ad campaigns. The goal in using focus groups and questionnaires/surveys may be to make advertisements as appealing as possible prior to launch, so that advertisements reach and impact their target audience. Recently, advertisers or third party companies have been compensating participants for their time participating in these surveys. However, these programs and surveys frequently compensate all participants, without analyzing the quality of their feedback. Therefore, many individuals may rush through the questions or discussion, without providing truthful or thoughtful answers.

The provided system and method may encourage individuals to participate using compensation but may limit the number of participants that receive compensation. An example of the disclosed system, method, and apparatus rewards thoughtful and truthful answers, by compensating individuals whose numerical answers fall closest to a comparison value calculated from the answers of all participants. The comparison value is meant to be a representation of a truthful or thoughtful answer. For example, the comparison value may be the average, median, or mode of all the answers received from users for a question in some embodiments. Therefore, in the example, as individuals answer survey questions relating to ads, they may more carefully and thoughtfully answer questions in order to analyze how the typical viewer or listener of an advertisement may think about a viewed advertisement in relation to a particular question. This is because only a portion of participants with answers closest to the comparison value may receive compensation.

Further, one feature of the present disclosure may include that the "correct" answers to the questions presented to participants are not known when the user answers questions related to the viewed advertisements. The user's answers may not be compared to right or wrong answers, but rather to the answers of other users/participants reviewing the same advertisements and being asked similar or identical questions. Therefore, a correct answer may be unknown until after all participants have submitted an answer. Once submitted, participants may then be evaluated, sorted, and compared to other users, and this comparison may play a role in the compensation and/or rewards received by participants.

Reference is made herein to content items to be presented. As disclosed herein, a content item may include anything that a party wants rated or reviewed, such as advertisements, images, videos, text, product designs, company logos, movies, books, or anything else that a user can view. As disclosed herein, an item may comprise any content. In the present disclosure, the terms "item," "content," and "content item" are intended to be interchangeable and synonymous. Items may also include a set of questions regarding the content item that the inquirer requests responses to. If there is not a tangible item an individual may view, such as a set of questions regarding the quality of service a company or organization provided a group of individuals, questions may be provided without a content item. Reference is also made herein to a feedback session. As disclosed herein, a feedback session may include an individual completing a review on his or her own at any given time, an organized meeting of individuals for the purpose of completing one or more reviews, or any other period of time set aside for completing a review. As disclosed herein, an implementation may be configured to conduct a plurality of feedback sessions. At least a portion of a result or a predictive model determined from one or more feedback session may be used by another feedback session.

System Embodiment

FIG. 1 shows an example diagram of a system 100 for evaluating and selecting users that provided thoughtful responses to questions regarding content items, according to one aspect of the present disclosure. In the example system 100, a user 102, a user 104, and a user 106 provide answer values 224, 228 (FIG. 2) into a device 108, 110, 112, such as a computer 108, a smart phone 110, or a tablet 112. It should be appreciated, however, that the device may be any device and is not limited to the devices disclosed herein. For example, the device may include any personal computer, smart phone, tablet, Personal Digital Assistant (PDA), television, gaming console, etc. The devices 108, 110, 112 may be configured to display to the users 102, 104, and 106 a website or application that users may access in order to provide their input (e.g., answer values 224, 228) regarding prompts or questions presented to users concurrently with, prior to, or after perceiving an advertisement.

Figure 2:
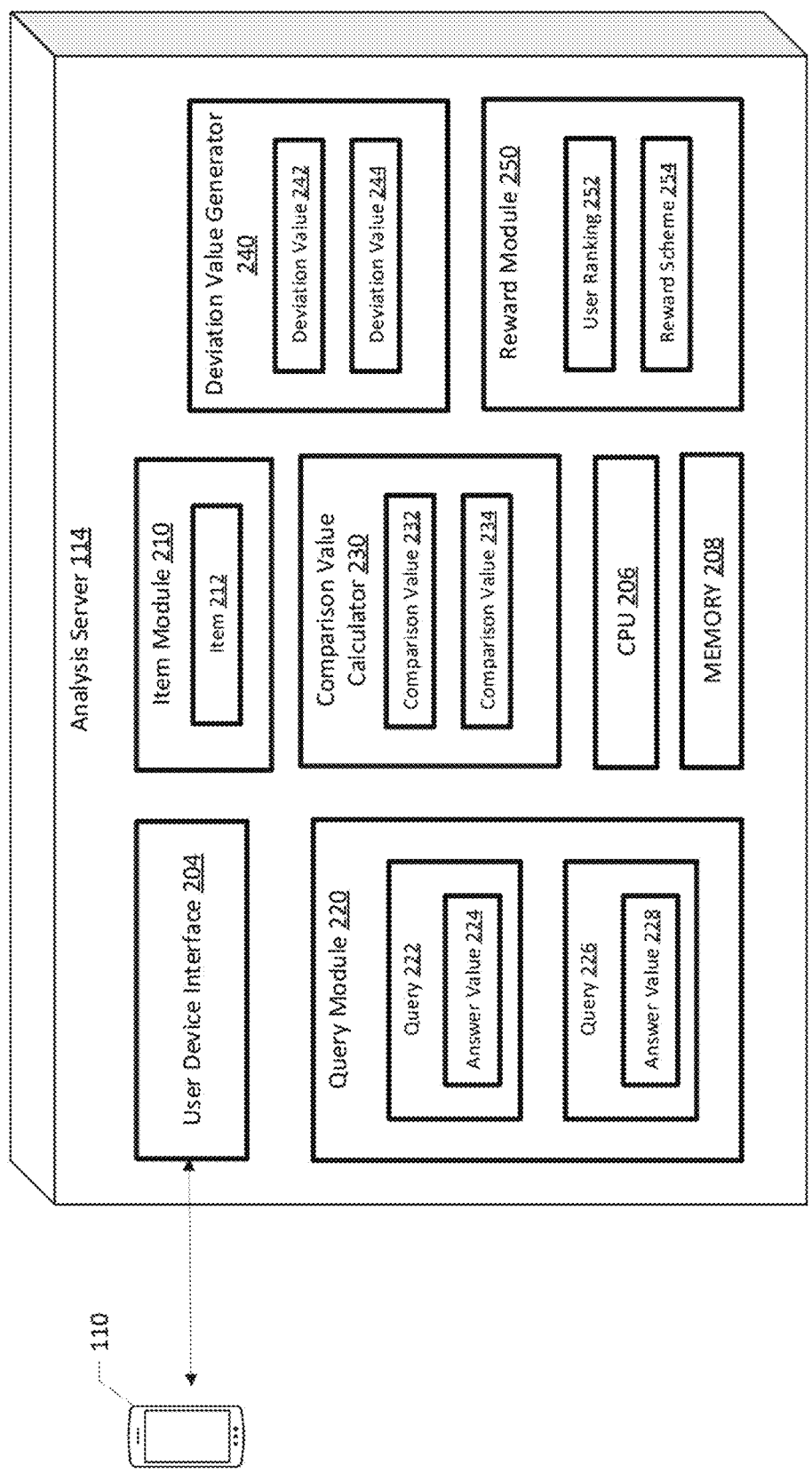
FIG. 2 illustrates an example embodiment of an analysis server of the present disclosure.

The answer values 224, 228 received at the devices 108, 110, 112 may be directed to an analysis server 114 via a network 118. The network 118 may be wired or wireless. The analysis server 114 may execute calculations or instructions based on the answer values 224, 228 of the users 102, 104, 106. The calculations and instructions executed by the analysis server 114 determine which users 102, 104, 106 should be selected as providing thoughtful responses by comparing the answer values 224, 228 of the users 102, 104, 106 and sorting the users 102, 104, 106 based on how their answer values 224, 228 deviate from a comparison value 232, 234 (FIG. 2). It should be understood that each device 108, 110, 112 and the analysis server 114, may include a processor and/or memory.

As used herein, a memory device refers to a volatile or non-volatile memory device, such as RAM, ROM, EEPROM, or any other device capable of storing data. As used herein, physical processor or processor refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). Processors may be interconnected using a variety of techniques, ranging from a point-to-point processor interconnect, to a system area network, such as an Ethernet-based network. In an example, the one or more physical processors may be in the system 100. In an example, all of the disclosed methods and procedures described herein can be implemented by the one or more processors. Further, the system 100 may be distributed over multiple processors, memories, and networks.

The analysis server 114 may be in communication with or coupled to a database 116. The database 116 may be connected to the network 118. The database 116 may be a memory device as described above. Database 116 may store a variety of information. Specifically, database 116 may store the answer values 224, 228 from the users 102, 104 and 106; the equations, calculations, predictive models, or instructions used by the analysis server 114; the results of any analysis performed by the analysis server 114, etc. As indicated with the bi-directional dotted arrow between the analysis server 114 and the database 116, information may be communicated between them in both directions.

FIG. 2 shows an example diagram of the analysis server 114, according to an example embodiment of the present disclosure. The analysis server 114 includes different components that are representative of computational processes, routines, and/or algorithms. In some embodiments, the computational processes, routines, and/or algorithms may be specified in one or more instructions stored on a computer readable medium that, when executed by a processor of the analysis server 114, cause the analysis server 114 to perform the operations discussed below. For example, all or part of the computational processes, routines, and/or algorithms may be implemented by the CPU 206 and the memory 208. It should be appreciated that in other embodiments the components of the analysis server 114 may be combined, rearranged, removed, or provided on a separate device or server.

The analysis server 114 includes a user device interface 204 configured to be communicatively coupled to one or more devices 108, 110, 112. For example, the user device interface 204 is illustrated as being communicatively coupled to a device 110 (e.g., a smart phone). It should be appreciated, however, that the user device interface 204 may be communicatively coupled to any of the devices 108, 110, 112 discussed above. The analysis server 114 may also include an item module 210 which causes the processor of the analysis server 114 to present one or more content items 212 to one or more users 102, 104, 106 via the user device interface 204 and a device 108, 110, 112. For the duration of this disclosure, content item 212 will be referred to as ad 212. The analysis server 114 may also include a query module 220 which causes the processor of the analysis server 114 to present one or more queries 222, 226 to one or more users 102, 104, 106 via the user device interface 204 and a device 108, 110, 112. The query module 220 may also store the answer values 224, 228 provided by one or more users 102, 104, 106 in response to the one or more queries 222, 226. For example, the query module 220 may cause query 222 and query 226 to be presented to a user 102 and may store the answer value 224 and answer value 228 received in response to the queries 222 and 226, respectively.

The analysis server 114 may also include a comparison value calculator 230 which may analyze the answer values 224, 228 received from the users 102, 104, 106 to calculate a comparison value 232, 234 for each query 222, 226. The analysis server 114 may also include a deviation value generator 240 which compares the respective answer values 224, 228 from each user 102, 104, 106 with the calculated comparison value 232, 234 for a given query 222, 226 in order to generate deviation values 242, 244. The analysis server 114 may comprise one or more predictive model generated by the deviation value generator 240. The one or more predictive model may be any type of predictive model as might be known by one of ordinary skill. The one or more predictive model may be referred to as a predictive analytic model. The one or more predictive model may comprise one or more comparison value 232, 234 and a plurality of deviation values 242, 244. The analysis server 114 may also include a reward module 250 which may compare the deviation values 242, 244 of the users 102, 104, 106 and generate a user ranking 252 of sorted users 102, 104, 106 with lower deviation values 242, 244 for selecting users having a lower ranking corresponding to more thoughtful responses. The reward module 250 may also apply a stored reward scheme 254 to determine which users 102, 104, 106 to select as having provided more thoughtful responses to questions regarding the ad 212.

User Interface Embodiment

Figure 3:
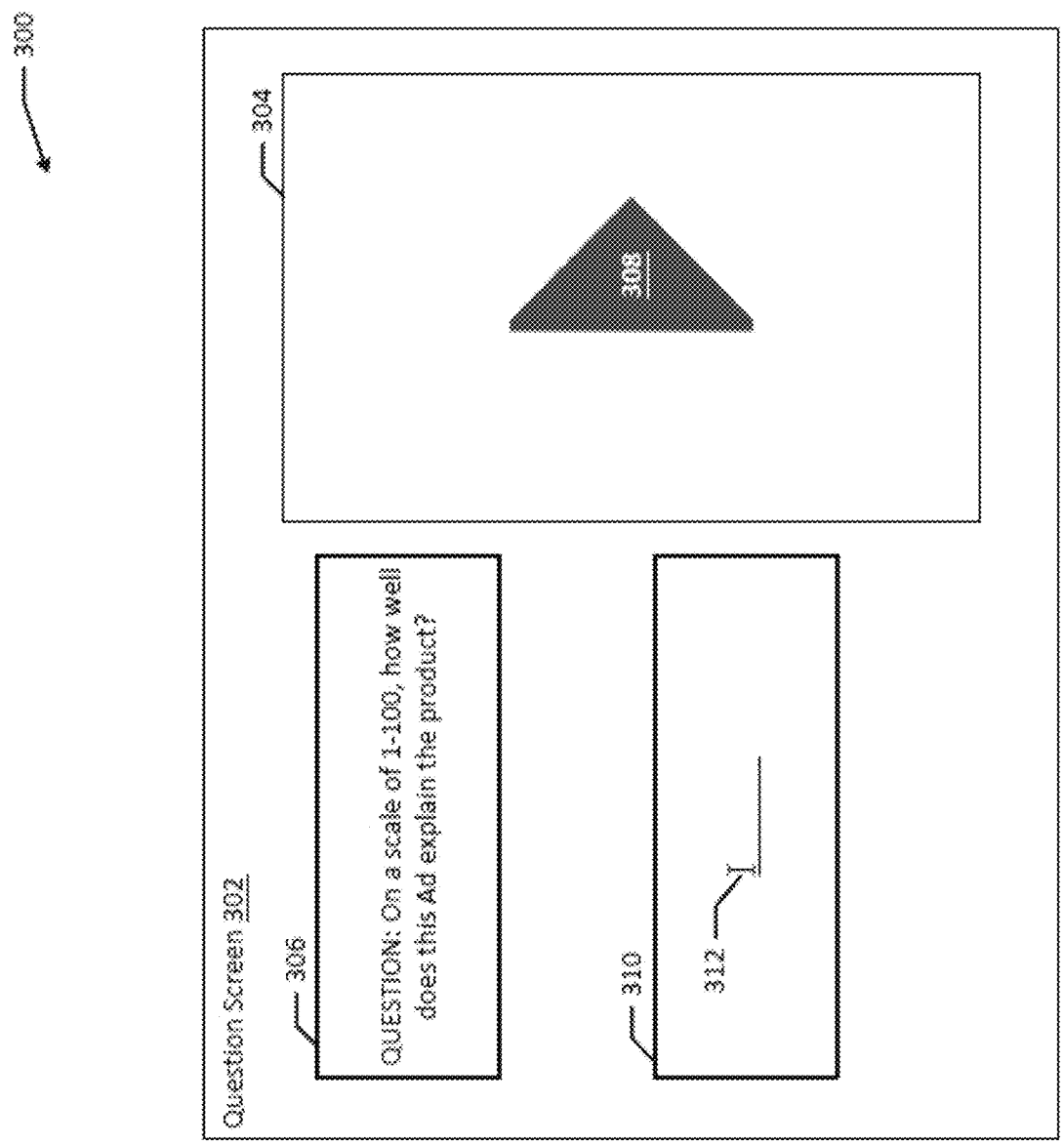
FIG. 3 illustrates an example question user interface of a system for evaluating responses from users that view content items, according to one aspect of the present disclosure.

FIG. 3 illustrates an example question user interface of the example system 100 for evaluating and selecting users that provide thoughtful responses to questions regarding content items, according to one aspect of the present disclosure. Specifically, a device 300 may display a user interface such as the question interface 302 in order to prompt users 102, 104, 106 for their answer values 224, 228. In the illustrated example, a user 102, 104, 106 is presented with an advertisement 304 on the question interface 302. The advertisement 304 may be in the form of a video, as suggested by the play button 308 located on the advertisement 304. In an alternate example, the advertisement 304 may be any type of advertisement users 102, 104, 106 may encounter, including, banner ads, radio ads, television ads, displays, bill boards, newspaper and magazine ads, etc. There is no limit to the type of advertisement 304 that may be viewed, listened to, or encountered in the question interface 302.

After viewing the advertisement 304, the user 102, 104, 106 may read a question prompt 306 that will include a question for the user 102, 104, 106. In the illustrated example, the user 102, 104, 106 may enter his or her answer (i.e., an answer value 224, 228) in the answer user interface 310. This answer may be typed, as indicated by the text cursor 312 located in the answer user interface 310. In one example, the question prompt 306 and the answer user interface 310 may be displayed on the question interface 302 while the user 102, 104, 106 is watching the advertisement 304. In an alternative example, the question prompt 306 and the answer user interface 310 may not be presented to the user 102, 104, 106 until after the user 102, 104, 106 has finished watching the advertisement 304 or until the user 102, 104, 106 has indicated that he or she is ready to answer questions.

Figure 4:
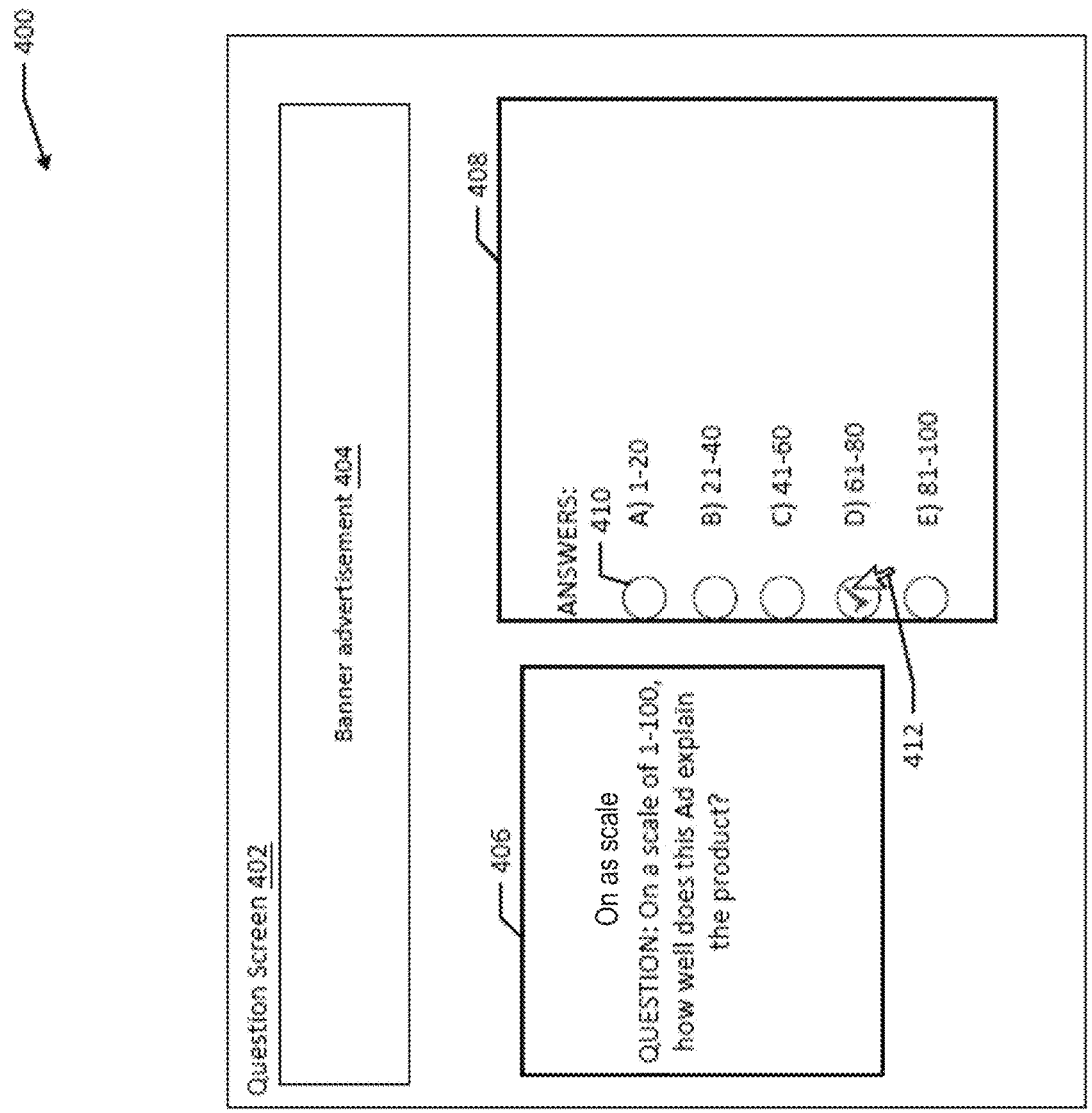
FIG. 4 illustrates an example question user interface of a system for evaluating responses from users that view content items, according to one aspect of the present disclosure.

FIG. 4 shows an alternate example question user interface of the example system 100 for evaluating and selecting users that provide thoughtful responses to questions regarding content items, according to one aspect of the present disclosure. In the illustrated example, a device 400 may display a question interface 402 to a user 102, 104, 106. The question interface 402 may be presented to the user 102, 104, 106 in a mobile application, on a website, etc. The question interface 402 may include a banner advertisement 404. After viewing the banner advertisement 404, or simultaneously with viewing the banner advertisement 404, a user 102, 104, 106 may be presented with or prompted to answer a question in a question prompt 406. The user 102, 104, 106 may be presented with an answer user interface 408 containing multiple choice answers. Each answer in the answer user interface 408 may be associated with a bubble 410. A user 102, 104, 106 may select his or her answer (i.e., an answer value 224, 228) from the bubbles 410 using a cursor 412. For example, the user 102, 104, 106 is illustrated as having selected answer choice "D" in the answer user interface 408. In an alternate example, users 102, 104, 106 may be presented with boxes to check, may be able to select the answer itself, or may be presented with a sliding scale instead of being presented with the bubbles 410. In an alternate example, the answer user interface 408 may include a fill in or type in option in case none of the multiple choice answers are relevant to the user 102, 104, 106.

Figure 5:
FIG. 5 illustrates an example interface for presenting a content item and a question regarding the content item and receiving a response either directed to the responder's own response to the content item and question, or directed to the responder's prediction of how a target group might respond to the content item and question in the future, according to one aspect of the present disclosure.

FIG. 5 illustrates an example interface 500 that a user 102, 104, 106 may be presented with on a device 108, 110, 112 for evaluating and selecting users that provide thoughtful responses to questions regarding content items such as for example ads 212, according to one aspect of the present disclosure. The example interface 500 may include a select ad type user interface 502 at which users 102, 104, 106 may select which type of ad 212 they would like to rate. For example, in the illustrated example interface 500, users 102, 104, 106 have the option of a video, image, or audio ad 212. It should be appreciated, however, that the ad type may be any of the types of advertisements previously mentioned in this disclosure. The example interface 500 may also include an ad user interface 504 for displaying an ad 212. For example, a video is displayed on the example ad user interface 504, indicated by the volume scale, pause button, play button, and full size button. In various embodiments, a user 102, 104, 106 may select the full size button in order to make the ad 212 fit the entirety of the interface 500.

The example interface 500 may also include a query user interface 506 which may list any number of queries that a user 102, 104, 106 may answer about the ad 212. For example, in the illustrated query user interface 506 there are four queries with numerical sliding scales and one question with bubbles. It should be appreciated that the query user interface 506 may take any of the forms previously discussed in relation to the question interface 302 and the question interface 402. In some embodiments, the query user interface 506 may be inoperable until the user 102, 104, 106 completes viewing the ad 212. In other embodiments, the user 102, 104, 106 may be able to answer queries in the query user interface 506 while viewing the ad 212.

In the depicted implementation the exemplary interface 500 comprises target group criteria description 508 presented to the user. The target group criteria description 508 presented to the user describes the target group selection criteria used for selecting the target group via the selection and targeting user interface 608, depicted for example at least by FIG. 6. In the depicted implementation the target group criteria description 508 presented to the user states "The target group is females from 30 to 40 years of age in New York City with college degrees." The target group criteria description 508 is presented to the user to enable the user to focus on the target group, based on the description of the target group selection criteria. The user may focus on the target group while answering a question regarding a content item from the perspective of a target group member. The user may focus on the target group while providing a response directed to predicting a future response by a target group member to a question regarding a content item.

The query user interface 506 may be configured to present a request to the user for the user to provide a prediction of how a member of the target group will respond to at least one question regarding the content item if members of the target group were presented the content item in the future. The request to the user for the user to provide a prediction of how a member of the target group will respond may be a requirement enforced by processor executable program instructions configured to execute on CPU 208. For example, the system may be configured so that the response is not accepted if the user does not indicate the responses are the user's predictions of how a member of the target group will respond in the future by selecting the selectable prediction indication 510. The query user interface 506 may be configured to prompt the user to indicate the responses are the user's predictions of the target group's future responses. The user may indicate the responses are the user's predictions of how a member of the target group will respond in the future by selecting the selectable prediction indication 510. In the depicted implementation the user has selected the selectable prediction indication 510. In the depicted implementation the user's responses comprising the predictions are received by the CPU 208 with the user selected selectable prediction indication 510.

The query user interface 506 may be configured to present a request to the user for the user to provide a response directed to the user's own individual response to at least one question regarding the content item. The request to the user for the user to provide a response directed to the user's own individual response may be a requirement enforced by processor executable program instructions configured to execute on CPU 208. For example, the system may be configured so that the response is not accepted if the user does not indicate the responses are the user's own individual responses by selecting the selectable individual response indication 512. The query user interface 506 may be configured to prompt the user to indicate the responses are the user's own individual responses. The user may indicate the responses are the user's own individual responses by selecting the selectable individual response indication 512. In the depicted implementation the user has allowed the selectable individual response indication 512 to remain unselected. In the depicted implementation only one of the selectable prediction indication 510 and the selectable individual response indication 512 may be selected at a time, enforced by processor executable instructions executing on the CPU 208. In a case where the user would have selected the selectable individual response indication 512, the user's responses comprising the user's own individual responses would be received by the CPU 208 with the user selected selectable individual response indication 512.

Inquirer Interface Embodiment

FIG. 6 shows an example inquirer platform interface 600, according to one aspect of the present disclosure. Inquirers desiring users 102, 104, 106 to rate their content items with the presently disclosed system, method, and apparatus may submit their content items using the example interface 600. The example interface 600 may include a content item type user interface 602 at which inquirers may choose the type of content item they would like to submit. The content item may be virtually any type of content item, for example, video, an image, music, billboards, television ads, radio ads, newspaper and magazine ads, internet ads, pop-up ads, direct mail advertising, posters, displays, signs, banner ads, etc. The example interface 600 may also have a company information user interface 604 which may have entries for an inquirer to input information about the inquirer and the content item.

The example interface 600 may include a query user interface 606 for an inquirer to decide which queries 222, 226 the inquirer would like the users 102, 104, 106 to answer. In the illustrated embodiment, the query user interface 606 includes a list of queries 222, 226 from which an inquirer may choose. In other embodiments, the query user interface 606 may present input fields for an inquirer to type its own queries and/or possible answers. In other embodiments still, the query user interface 606 may present both a list of queries 222, 226 and one or more input fields. It should be appreciated that an inquirer may select or create any number of queries 222, 226 at the query user interface 606 when submitting a content item.

The query user interface 606 may be configured to present a request to the user for the user to provide a prediction of how a member of the target group will respond to at least one question regarding the content item if members of the target group were presented the content item in the future. The query user interface 606 may be configured to prompt the user to indicate the responses are the user's predictions of the target group's future responses, using a distinct user selectable indication configured in the user interface for this purpose. The query user interface 606 may be configured to present a request to the user for the user to provide a response directed to the user's own individual response to at least one question regarding the content item. The query user interface 606 may be configured to prompt the user to indicate the responses are the user's own individual responses, using a distinct user selectable indication configured in the user interface for this purpose.

The example interface 600 may also include a selection and targeting user interface 608 at which the inquirer may select a number of options concerning selection criteria for the audience the inquirer is selecting. For example, the selection and targeting user interface 608 may include an option for targeting a specific gender, or age, or location, or user interest. It should be appreciated, however, that any type of selection criteria may be provided as an option on the selection and targeting user interface 608. For example, a predicting group and a responding target group may be distinct and exclusive from each other as a result of independent selection criteria distinguishing the predicting group from the responding target group. The system may be configured to implement independent instantiations of the selection and targeting user interface 608, to permit independently configuring selection criteria for distinct predicting and target groups. The selection criteria distinguishing the predicting group from the target group may be criteria chosen using the selection and targeting user interface 608. The selection criteria distinguishing the predicting group from the target group may comprise demographic criteria such as, for example, location, gender, age, occupation, education, or any other useful selection and targeting criteria as may be known by one of ordinary skill in the pertinent art. The distinct groups may be selected based on criteria chosen so that no user of the predicting group would be a member of the target group. The users of the predicting group may be presented, via a user interface, with a description of criteria identifying the target group, to enable the predicting group to focus on the target group based on the criteria.

The example interface 600 may also include a views selection user interface 610 at which an inquirer may select the number of views for which the inquirer would like responses. For example, the views selection user interface 610 illustrates that the inquirer may select either 20, 30, 50, 75, or 100 views. It should be appreciated, however, that any number of views may be offered on the views selection user interface 610 and/or there may be an input for selecting a custom number of views. The content item submitted will only be shown to the number of views purchased. Accordingly, the more views the inquirer purchases, the more data the inquirer will collect from users 102, 104, 106. In an alternate example, rather than selecting a certain number of users 102, 104, 106 or views for reviewing an ad 212, an advertiser may determine the feedback on a particular ad 212 may be open for a certain period of time, such as, for example, one week, two days, one hour, one year, etc.

Method Embodiment

Figure 7:
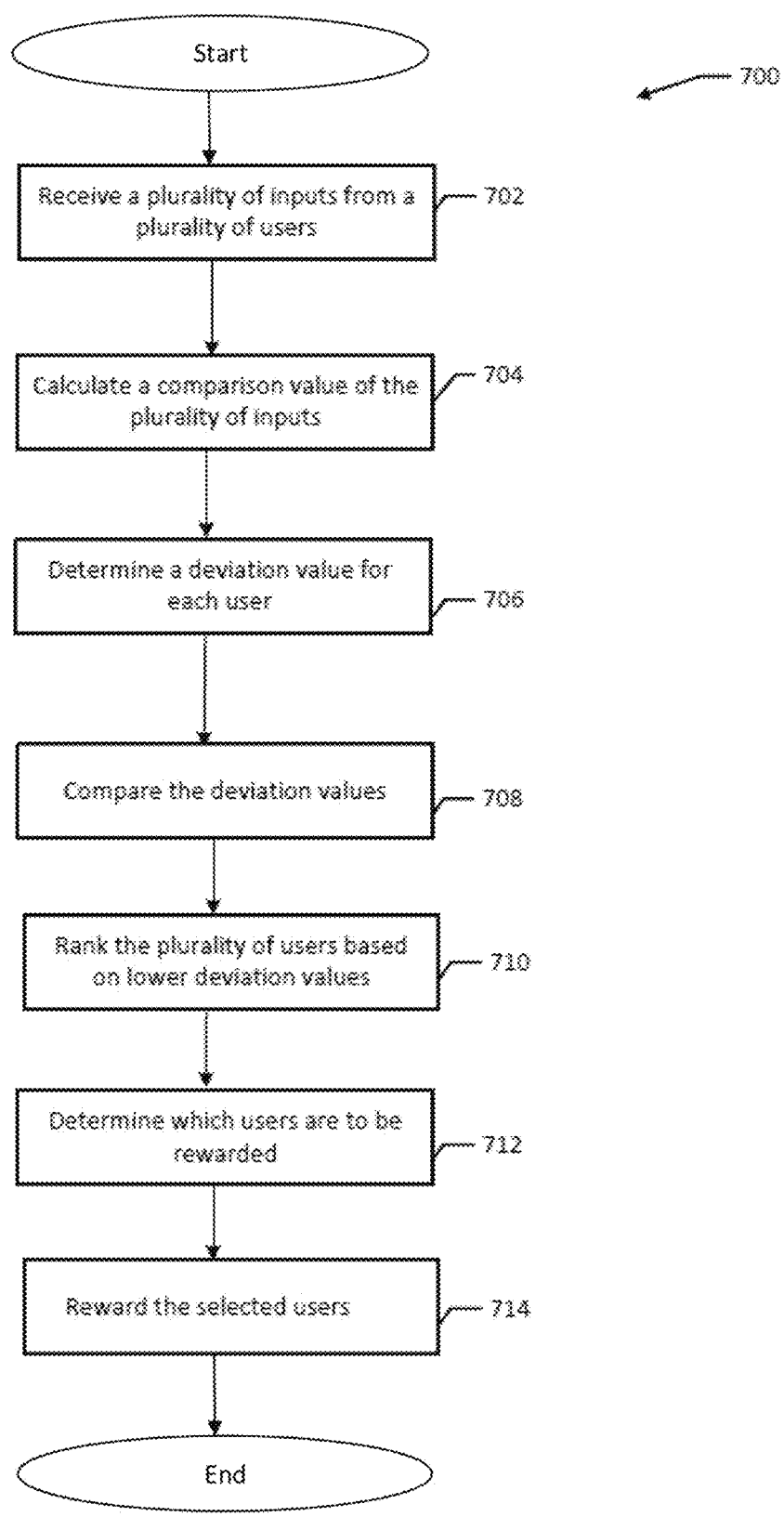
FIG. 7 is a flowchart illustrating an example method for using a system for evaluating responses from users that view content items, according to one aspect of the present disclosure.

FIG. 7 shows an example method 700 for evaluating and selecting users 102, 104, 106 that provide thoughtful responses to questions regarding content items, according to an example embodiment of the present disclosure. The method 700 may be implemented on a computer system, such as the analysis server 114 and/or the devices 108, 110, 112. For example, the method 700 may be implemented by the item module 210, the query module 220, the comparison value calculator 230, the deviation value generator 240, and/or the reward module 250 of the analysis server 114. The method 700 may also be implemented by a set of instructions stored on a computer readable medium that, when executed by a processor, cause the computer system to perform the method. For example, all or part of the method 700 may be implemented by the CPU 206 and the memory 208. Although the examples below are described with reference to the flowchart illustrated in FIG. 7, many other methods of performing the acts associated with FIG. 7 may be used. For example, the order of some of the steps may be changed, certain steps may be combined with other steps, one or more of the steps may be repeated, and some of the steps described may be optional.

The example method 700 begins by receiving a plurality of answer values 224, 228 from a plurality of users (step 702). For example, as depicted in FIG. 1, a first user may be the user 102, a second user may be the user 104, and a third user may be the user 106. The user 102 may provide a first answer value 224, 228 via the device (computer) 108, the user 104 may provide a second answer value 224, 228 via the device (smart phone) 110, and the user 106 may provide a third answer value 224, 228 via a device (tablet) 112. The answer value 224, 228 provided by the users 102, 104 and 106 may correspond to answer value 224, 228 inserted in, for example, the answer user interface 210 in FIG. 2 or the answer user interface 308 in FIG. 3.

In the example, the user 102 may have been presented with the question interface 202 of FIG. 2 on the device 108, and input the number "77" in the answer user interface 210 after viewing advertisement 204. Similarly, in the example, the user 104 may have been presented with question interface 202 on device 110, and input the number "20" in the answer user interface 210 after viewing advertisement 204. Similarly, in the example, the user 106 may have been presented with the question interface 202 on the device 112, and input the number "37" in the answer user interface 210 after viewing the advertisement 204.

Next, a comparison value 232, 234 of the plurality of answer values 224, 228 may be calculated (step 704). A comparison value 232, 234 may be any number calculated from the plurality of answer values 224, 228 that is treated as a "typical" or "average" answer that the answer values 224, 228 of the users 102, 104, 106 may be compared to in order to determine if the users 102, 104, 106 gave thoughtful answers. For example, a comparison value 232, 234 may be based on a statistic such as, for example, the average, mean, or mode of a set of answer values 224, 228 given in response to a query 222, 226. In other embodiments, a comparison value 232, 234 may be an average of a set of answer values 224, 228 after any outliers are removed from the set. In some embodiments, a comparison value 232, 234 may be calculated from only the answer values 224, 228 received after presenting the ad 212 to a set number of users 102, 104, 106. In other embodiments, a comparison value 232, 234 may be calculated from a larger population of answer values 224, 228, for example, by including the answer values 224, 228 received after previously presenting the ad 212 to a different set of users 102, 104, 106 or to the general population. In other embodiments still, a comparison value 232, 234 may be calculated from historical data received when testing a different advertisement. Or, a comparison value 232, 234 may be a number chosen by an advertiser that the advertiser deems to be a thoughtful answer, according to an embodiment.

In some embodiments, a comparison value 232, 234 is not calculated until an answer value 224, 228 has been received from every user 102, 104, 106. In other words, a comparison value 232, 234 is calculated when the survey/feedback period is over and users 102, 104, 106 can no longer submit answer values 232, 234. In an alternative embodiment, a comparison value 232, 234 may be calculated when a threshold number of answer values 224, 228 has been received, even if more answer values 224, 228 are received after the threshold number is met. The calculated comparison value 232, 234 is not affected by the answer values 224, 228 received after the threshold number is met, in the alternative embodiment, and is used for the users 102, 104, 106 submitting the respective answer values 224, 228 after the threshold number is met.

In a non-limiting example, an advertiser may leave feedback open for two weeks. After one week, two hundred users 102, 104, 106 may submit answer values 224, 228 to the respective one or more queries 222, 226, which may be considered a threshold number of answer values 224, 228 sufficient to calculate a comparison value 232, 234. In the second week, one hundred more users 102, 104, 106 may submit answer values 224, 228; however, these answer values 224, 228 do not affect the already calculated comparison value 232, 234. The deviation values 242, 244 for each of the one hundred more users 102, 104, 106 are calculated based on the already calculated comparison value 232, 234 (as discussed in more detail below). In one aspect of the present disclosure, the threshold number of answers 224, 228 is a number of answer values 224, 228 sufficient to calculate a comparison value 232, 234 representative of a thoughtful answer. For example, fifty, one hundred, or two hundred answer values 232, 234 rather than one, two, or three answer values 232, 234. It should be appreciated, however, that the threshold number of answer values 224, 228 may be any number. It should also be appreciated that the threshold number may be of users 102, 104, 106 rather than answer values 224, 228, in some embodiments.

As previously discussed, a comparison value 232, 234 is meant to represent a truthful or thoughtful answer that the answer values 224, 228 of users 102, 104, 106 may be compared against. A user 102, 104, 106 does not know what the comparison value 232, 234 is for any given query 222, 226. In some embodiments, as discussed above, the comparison value 232, 234 is not calculated until all answer values 224, 228 are submitted from all users 102, 104, 106 and thus is not even calculated at the time a user 102, 104, 106 submits his or her answer value 224, 228. Therefore, if a query 222, 226 shown to fifty users 102, 104, 106 presents a scale from 0-100 for how effective a user 102, 104, 106 thought the ad 212 was, those fifty users 102, 104, 106 will choose many different answer values 224, 228 if answered thoughtfully. Sometimes the answer values 224, 228 received may be clustered in a certain range because the users 102, 104, 106 had similar opinions. Other times, the answer values 224, 228 may be over a wide range because the users 102, 104, 106 had differing opinions.

It is not likely, however, that most or all users 102, 104, 106 will select "0" or "100" on the scale and therefore the comparison value 232, 234 will likewise not be "0" or "100" for a query 222, 226. A user 102, 104, 106 who is careless when answering the query 222, 226 and quickly enters "0" or "100," or quickly enters random numbers for a series of queries 222, 226, therefore runs the risk of not being near the comparison value or values 232, 234. Rather, the disclosed system, method, and apparatus encourages users 102, 104, 106 to answer the queries 222, 226 thoughtfully and carefully in order to attempt to be near the comparison value 232, 234. Accordingly, it should be appreciated that the comparison value 232, 234 may be calculated in any manner such that the calculated value serves this purpose of a thoughtful answer.

Continuing with the example in which the user 102 input the number "77," the user 104 input the number "20," and the user 106 input the number "37," the comparison value 232, 234 may be the average of the three numbers in some embodiments. For example, 77, 20, and 37 are added, and then the total will be divided by three, as there are three users. Therefore, the average is 44.667. Rounding up, the average is 45. This average may be calculated by the analysis server 114. It should be appreciated that the analysis server 114 may execute all comparison value 232, 234 calculations. The analysis server 114 may use the exact average (e.g., 44.667), the nearest whole number average (e.g., 45), or the base number average (e.g., 44) when determining the average. It should be appreciated that if the exact average is directly in between two whole numbers (e.g., 44.5), then the analysis server 114 may either round up to 45 or round down to 44 in various embodiments. In this example, the analysis server 114 will use the nearest whole number average (e.g., 45).

It should also be understood that, in various embodiments, more than one query 222, 226 will be presented to the users 102, 104, 106 for a given ad 212. In such embodiments, a comparison value 232, 234 is calculated for each query 222, 226. For example, if thirty users 102, 104, 106 are presented with query 222 and query 226 in response to ad 212, then a comparison value 232 is calculated for the thirty answer values 224 in response to query 222 and a comparison value 234 is calculated for the thirty answer values 228 in response to query 226. It should be appreciated that any number of queries 222, 226 may be presented and a comparison value 232, 234 will be calculated for each one.

Next, a deviation value 242, 244 is generated for each user 102, 104, 106 based on the comparison value 232, 234 calculated (step 706). A deviation value 242, 244 may be the difference between the answer value 222, 226 of a user 102, 104, 106 and the comparison value 232, 234, according to an aspect of the present disclosure. For example, continuing with the example in which the comparison value 232, 234 calculated was "45," a deviation value 242, 244 for the first answer value 224, 228 ("77") by the first user 102 is "32." A deviation value 242, 244 for the second answer value 224, 228 ("20") by the second user 104 is "25." A deviation value 242, 244 for the third answer value 224, 228 ("37") by the third user 106 is "8." The deviation values 242, 244 may be calculated by the analysis server 114.

It should be understood that in various embodiments in which more than one query 222, 226 is presented to the users 102, 104, 106, a deviation value 242, 244 is generated for each query 222, 226 for the first user 102, for each query 222, 226 for the second user 104, and for each query 222, 226 for the third user 106. In such embodiments, the deviation values 242, 244 for the first user 102 are added together to generate a total deviation value. The same is done for the second user 104 and the third user 106. It should be appreciated that the disclosed system, method, and apparatus may be used with any number of users 102, 104, 106 and the above example is merely for illustrative purposes.

The deviation values 242, 244 are then compared (step 708), and the users 102, 104, 106 are sorted based on lower deviation values 242, 244 (step 710). For example, the first deviation value 242, 244 of "32" for the first user 102 is greater than the second deviation value 242, 244 of "25" for the second user 104. Further, the second deviation value 242, 244 of "25" for the second user 104 is greater than the third deviation value 242, 244 of "8" for the third user 106. Therefore, these deviation values 242, 244 are compared to rank the users 102, 104, 106. The users 102, 104, 106 with the lowest deviation value 242, 244 may be at the top of the sorted users, as they may have the better score. Therefore, in this example, the third user 106 may come in first place, the second user 104 in second place, and the first user 102 in third place, when sorted according to the thoughtfulness of their respective responses.

The rankings may be utilized to determine which users 102, 104, 106 should be rewarded for their participation according to a reward scheme 254 (step 712). For example, a reward scheme 254 may require that only the first place user 102, 104, 106 be rewarded. Alternately, the lowest 10%, 20%, 30% etc. of deviation values 242, 244 may be rewarded. For example, an advertiser may only be concerned with extreme outliers and may reward the lowest 90% of deviation values 242, 244, only excluding 10% of users 102, 104, 106, according to an embodiment. In an alternate example, the top five users may be rewarded. In another example, a first set of users with the lowest deviation values 242, 244 (e.g., lowest 10%) may receive a first reward, a second set of users with the next lowest deviation values 242, 244 (e.g., lowest 11-20%) may receive a second, different reward, and so on for any number of sets of users.

By only rewarding a portion of the participating users 102, 104, 106, there may be further encouragement for the users 102, 104, 106 to provide thoughtful answer values 222, 226 in order to attempt to have the lowest deviation value 242, 244. Accordingly, it should be appreciated that any reward scheme 254 may be used to generate that encouragement by only compensating a portion of the participating users 102, 104, 106. An example reward scheme 254 is detailed in the following paragraphs.

Based on user rank, a video ad may pay:
Top 5% of users: $1.00
Top 5%-10% of users: $0.75
Top 10%-15% of users: $0.50
Top 15%-25% of users: $0.25
Based on user rank, an image ad may pay:
Top 5%: $0.50
Top 5%-10%: $0.25
Based on user rank, an audio ad may pay:
Top 5%: $0.75
Top 5%-10%: $0.50
Top 10%-15%: $0.25

It should also be understood that in various embodiments in which more than one query 222, 226 is presented to the users 102, 104, 106, the users 102, 104, 106 will be ranked according to their total deviation values. As such, the reward scheme 254 described above will apply in the same manner to the ranking of total deviation values as it does to the ranking of deviation values 242, 244.

For example, the Table 1 below illustrates the answer values 224, 228 for the users 102, 104, and 106 in response to four queries 222, 226 (i.e., Q1-Q4). The users 102, 104, and 106 had to answer on a 1-100 scale after viewing the ad in the example and the comparison value 232, 234 for each query 222, 226 was calculated as the average of the answer values 224, 228 received. The comparison values 232, 234 for the four queries 222, 226 were calculated as 75, 76, 74, and 75 respectively.

TABLE 1

Example User Query Answers:

| USER | Q1 | Q2 | Q3 | Q4 |
|---|---|---|---|---|
| 102 | 70 | 75 | 65 | 71 |
| 104 | 74 | 75 | 78 | 80 |
| 106 | 81 | 78 | 79 | 74 |
| AVERAGE | 75 | 76 | 74 | 75 |

Table 2 below illustrates the determined deviation values 242, 244 for each user 102, 104, and 106 for each query 222, 226. For example, the user 102 has an answer value of "70" for query 1 (i.e., Q1) and the comparison value 232, 234 for Q1 is "75." Therefore, the deviation value 242, 244 for the user 102 for Q1 is "5." Table 2 also illustrates the total deviation values for each user 102, 104, and 106. The total deviation value for each user 102, 104, 106 is the sum of their deviation values 242, 244 for each query 222, 226. Based on the determined total deviation values in this example, the user 104 had the lowest total, the user 106 had the second lowest total, and the user 102 had the highest total.

TABLE 2

Example User Scores (sum of individual queries):

| USER | Q1 | Q2 | Q3 | Q4 | TOTALS |
|---|---|---|---|---|---|
| 102 | 5 | 1 | 9 | 4= | 19 |
| 104 | 1 | 1 | 4 | 5= | 11 |
| 106 | 6 | 2 | 5 | 1= | 14 |

After it is determined which users 102, 104, 106 should be rewarded, those determined users 102, 104, 106 are rewarded (step 714). For example, the advertisers, the platform, or the operators of the platform may determine that the lowest score (e.g., the third user 106) will receive $1.00, and the second lowest score (e.g., the second user 104) will receive $0.50. Thus, users 104 and 106 may be provided these rewards by the platform, operators of the platform, or the advertisers directly. It should be appreciated that the reward can also be gift cards, credits, goods, etc. in addition to money.

In many embodiments, a reward is not provided to any users 102, 104, 106 until after the feedback period is over and all users 102, 104, 106 are ranked based on their calculated deviation values 242, 244 or total deviation values. In an alternative embodiment, a reward may be provided to a user 102, 104, 106 immediately, or soon thereafter, if a deviation value 242, 244 of zero is determined for the user 102, 104, 106. This is with the understanding that a user 102, 104, 106 cannot do better than a deviation value 242, 244 of zero and thus is guaranteed a reward. It should also be appreciated that other deviation values 242, 244 or total deviation values may be chosen as an automatic reward benchmark other than zero (e.g., 1, 2, 3, . . . 10, etc.). For example, in instances when a comparison value 232, 234 is calculated prior to the feedback period closing, if a user 102, 104, 106 then submits one or more answer values 224, 228, a deviation value 242, 244 or total deviation value may be determined for that user 102, 104, 106 prior to the feedback period closing. If the deviation value 242, 244 or total deviation value for that user 102, 104, 106 is determined to be at or below the automatic reward benchmark, then the user 102, 104, 106 may automatically receive a reward and does not have to wait until the feedback period closes.

Figure 8:
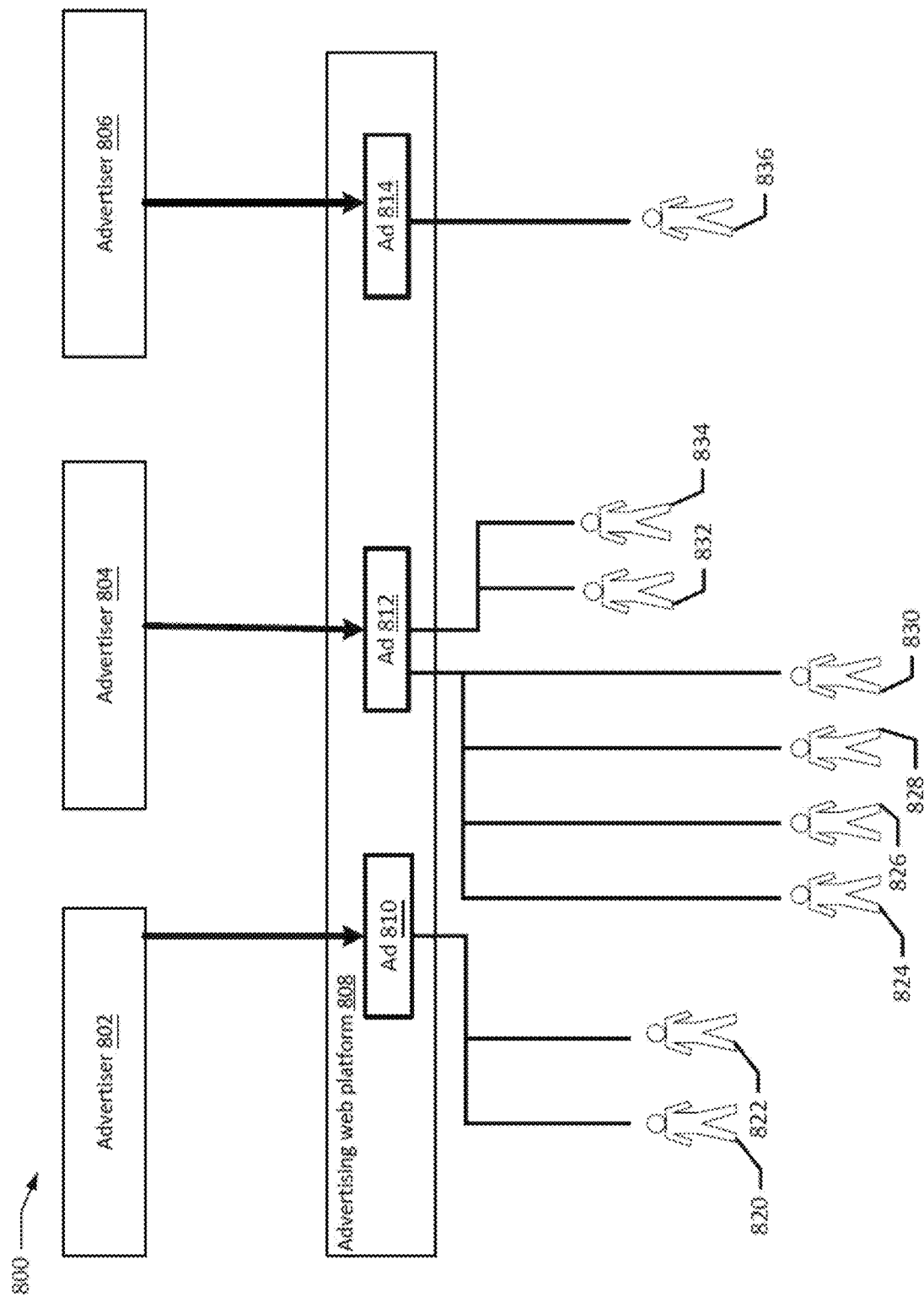
FIG. 8 is an example network diagram of a system for evaluating responses from users that view content items, according to one aspect of the present disclosure.

FIG. 8 shows an example diagram of a system for evaluating and selecting users that provided thoughtful responses to questions regarding content items, according to one aspect of the present disclosure. In the example, the advertisers 802, 804, and 806 may provide advertisements that they would like to reward users for watching and answering queries 222, 226 about. These advertisements, or Ads 810, 812, and 814 are placed onto an advertising web platform 808 either directly by the advertisers 802, 804, 806 (e.g., using the example inquirer platform interface 600) or indirectly by a party controlling access to the advertising web platform 808. In the example, the advertiser 802 placed the Ad 810 onto the advertising web platform 808, while the advertisers 804 and 806 provided their Ads 812 and 814, respectively, to a third party to place onto the advertising web platform 808.

The advertisers 802, 804, and 806 in the example, may provide instructions as to how many users 102, 104, 106 may view ads 212, how many users 102, 104, 106 may answer a specific set of queries 222, 226, how many results are required before receiving a reward, who the target audience is for each advertisement, etc. For example, the advertiser 802 may specify that only two users, the users 820 and 822, are needed to view and answer questions regarding the Ad 810. Or, in an alternate example, the advertiser 802 may have specified that seven females should review the Ad 810. In this alternative example, the advertising web platform 808 may be waiting for five more females to sign into the web platform 808 and answer questions regarding the Ad 810 before beginning computations for one or more comparison values 232, 234. It should be appreciated that, rather than selecting a certain number of users 102, 104, 106 for reviewing an ad 212, an advertiser may also determine the feedback on a particular ad 212 may be open for a certain period of time, such as, for example, one week, two days, one hour, one year, etc.

The advertiser 804, in the example, may have specified two separate sets of queries 222, 226 regarding the Ad 812, and therefore required two groups of user 102, 104, 106. The advertiser 804 may have specified that one group may contain four users 824, 826, 828, and 830, and the average should be calculated for the comparison value 232, 234 with the reward going to the one user with the lowest deviation value 242, 244 from the average, according to an embodiment. The advertiser 804 may have also specified that the second set of queries 222, 226 only requires two users 832 and 834, and they both will receive rewards regardless of their answer values 224, 228, according to an embodiment.

Continuing with the example, the advertiser 806 may have specified only one user 836 may view and answer queries 222, 226 relating to the Ad 814. Therefore, the user 836 may automatically receive a reward. It should be appreciated that any number of users 102, 104, 106 may be utilized by advertisers in answering queries 222, 226 related to viewed ads 212. For example, there may be 50, 100, 10,000 users, etc. that answer queries 222, 226 for advertisers.

Figure 9:
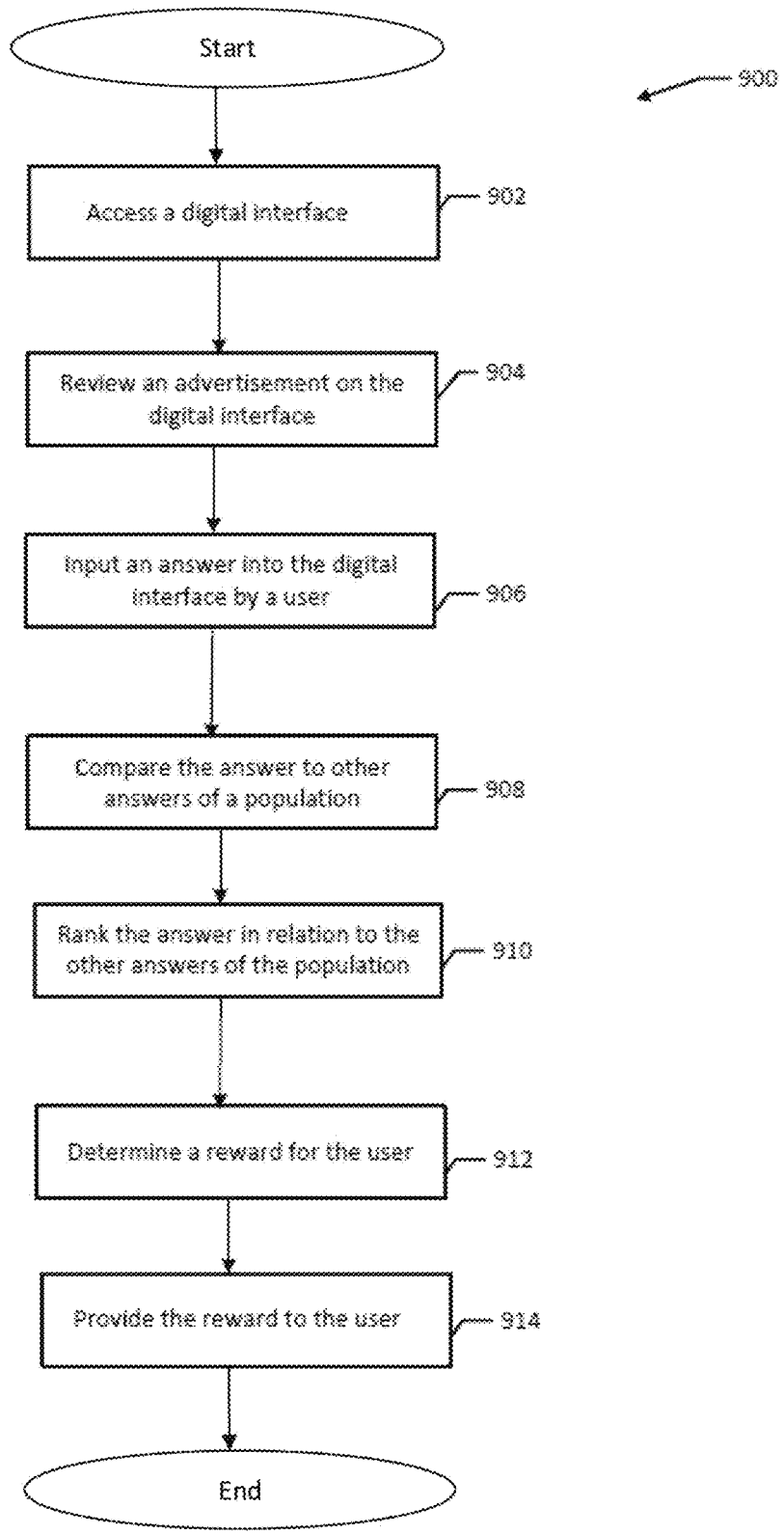
FIG. 9 is a flowchart illustrating an example method for using a system evaluating responses from users that view content items, according to one aspect of the present disclosure.

FIG. 9 illustrates an example method 900 for using a system for evaluating and selecting users that provided thoughtful responses to questions regarding content items, according to one aspect of the present disclosure. The method 900 may be implemented on a computer system, such as the analysis server 114 and/or the devices 108, 110, 112. For example, the method 900 may be implemented by the item module 210, the query module 220, the comparison value calculator 230, the deviation value generator 240, and/or the reward module 250 of the analysis server 114. The method 900 may also be implemented by a set of instructions stored on a computer readable medium that, when executed by a processor, cause the computer system to perform the method. For example, all or part of the method 900 may be implemented by the CPU 206 and the memory 208. Although the examples below are described with reference to the flowchart illustrated in FIG. 9, many other methods of performing the acts associated with FIG. 9 may be used. For example, the order of some of the steps may be changed, certain steps may be combined with other steps, one or more of the steps may be repeated, and some of the steps described may be optional.

The example method begins by accessing a digital interface (step 902). For example, a user such as the user 102 in FIG. 1 may access a digital interface such as digital interface (computer) 108. Next, an ad 212 is reviewed on the digital interface (step 904). For example, the user 102 may review an ad 212 on the digital interface (computer) 108. This may be by accessing a website, portal, application, or program loaded onto or accessible via the digital interface (computer) 108. The user 102 may, for example, be viewing the banner advertisement 404 of FIG. 4 on the digital interface (computer) 108.

In various embodiments, an answer value 224, 228 is then input into the digital interface by a user (step 906). For example, the user 102 may select/input an answer value 224, 228 from the answer user interface 408 about the viewed banner advertisement 404 after reviewing a question prompt 406. Next, the answer value 224, 228 is compared to other answer values 224, 228 of a population (step 908). For example, if answer D is selected from the answer user interface 408 by the user 102, the answer values 224, 228 selected by other user 102, 104, 106 (the population) may be compared to the answer values 224, 228 of the user 102. Advertisers may select as many user 102, 104, 106 as desired to review ads 212 and provide feedback. For example, the answer values 224, 228 of the population may include answer values 224, 228 from the user 104 and the user 106. The answer values 224, 228 of the user 104 and the user 106 may be compared to the answer values 224, 228 of the user 102. This comparison may include taking the average of all the answers values 224, 228, and calculating a deviation value 242, 244 from the average for each answer value 224, 228. It should be appreciated that the comparison may include any of the previously discussed methods for calculating comparison values 232, 234 and deviation values 242, 244. In an alternate example, rather than selecting a certain number of users 102, 104, 106 for reviewing an ad 212, an advertiser may determine the feedback on a particular ad 212 may be open for a certain period of time, such as, for example, one week, two days, one hour, one year, etc.

Next, the answer value 224, 228 is sorted in relation to the other answer values 224, 228 of the population (step 910). For example, the participants in the population (the users 104 and 106) and the user 102 may be sorted according to their deviation values 242, 244 calculated previously. The participant with the lowest deviation score may have the "best" score. In this example, the user 102 may be in the top 20% of lowest deviation scores, but not in the top 10% as compared to the population (e.g., including the users 104 and 106).

Next, a reward is determined for the user 102, 104, 106 (step 912). In the example, the users 102, 104, 106 (population) with the top 10% of lowest deviation values 242, 244 may receive $0.50, and the participants not in the top 10% but in the top 20% of lowest deviation values 242, 244 may receive $0.25. Therefore, it may be determined that the user 102 may receive $0.25, as the user 102's scores are in the top 20% of lowest deviation values 242, 244. Next, the reward is provided to the user 102, 104, 106 (step 914). In the example, the user 102 may receive $0.25.

Figure 10:
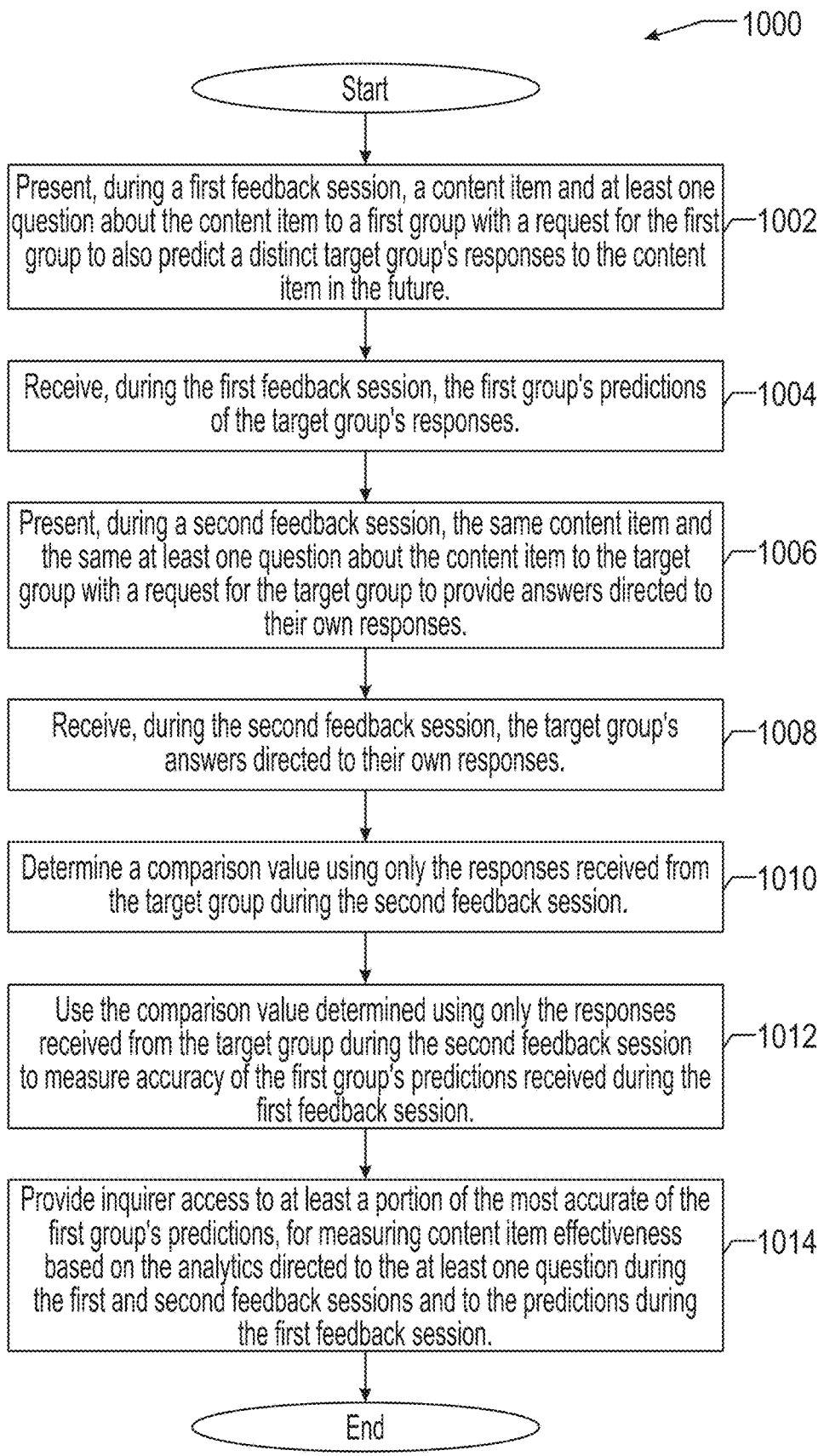
FIG. 10 is a flowchart illustrating an example method for using a system configured to provide an inquirer access to market research from users that most intensely focused on content, based on using a predictive model constructed for a target group to measure accuracy of a predicting group's predictions of answers from the responding target group, for the same content and question about the content, selecting as most intensely focused the predicting group users that most accurately predicted the responding target group member's responses, and providing the inquirer with access to market research results from the most intensely focused users of the predicting group.

FIG. 10 illustrates an example method 1000 for using a system configured to provide an inquirer access to market research from users that most intensely focused on content, based on using a predictive model constructed for a responding target group to measure accuracy of a predicting group's predictions of answers from the responding target group, according to one aspect of the present disclosure. The method 1000 may be implemented on one or more computer system, such as the analysis server 114 and/or the devices 108, 110, 112. For example, the method 1000 may be implemented by the item module 210, the query module 220, the comparison value calculator 230, the deviation value generator 240, and/or the analysis server 114, and/or the database 116. The method 1000 may also be implemented by a set of instructions stored on one or more computer readable medium that, when executed by a processor, cause the computer system to perform the method. For example, all or part of the method 1000 may be implemented by the CPU 206 and the memory 208. Although the examples below are described with reference to the exemplary process illustrated by the flowchart in FIG. 10, other methods of performing the acts associated with FIG. 10 may be used. For example, the order of some of the steps may be changed, certain steps may be combined with other steps, one or more of the steps may be repeated, and some of the steps described may be optional.

In the depicted implementation, the example method 1000 begins by presenting, during a first feedback session, a content item and at least one question about the content item to a predicting group with a request for the predicting group to also predict a distinct target group's responses to the content item in the future (step 1002). The content item and at least one question about the content item may be presented via interface 500 (FIG. 5) to a predicting group chosen using selection and targeting user interface 608 (FIG. 6). The predicting group may be distinct from the target group and the groups may be selected based on criteria chosen so that no user of the predicting group would be a member of the target group. The users of the predicting group may be presented, via interface 500 (FIG. 5), with a description of criteria identifying the target group, to enable the predicting group to focus on the target group based on the criteria.

In the depicted implementation, the example method 1000 continues by receiving, during the first feedback session, the predicting group's predictions of the target group's future responses (step 1004). In the depicted implementation, the user's responses comprising the predictions are received by the CPU 208 with the user selected selectable prediction indication 510, indicating the responses are the user's predictions of how a member of the target group will respond in the future.

In the depicted implementation, the example method 1000 continues by presenting, during a second feedback session, the same content item and the same at least one question about the content item to the target group with a request for the target group to provide answers directed to their own individual responses (step 1006). The content item and at least one question about the content item may be presented via interface 500 (FIG. 5) to the target group chosen using selection and targeting user interface 608 (FIG. 6). The target group may be distinct from the predicting group and the groups may be selected based on criteria chosen so that no user of the predicting group would be a member of the target group.

In the depicted implementation, the example method 1000 continues by receiving, during the second feedback session, the target group's answers directed to their own individual responses (step 1008). In the depicted implementation the target group's answers comprising their own individual responses are received by the CPU 208 with the user selected selectable individual response indication 512.

In the depicted implementation, the example method 1000 continues by constructing a predictive model of the target group comprising a comparison value determined using only the responses received from the target group during the second feedback session (step 1010). The predictive model of the target group may comprise one or more comparison value 232, 234 and a plurality of deviation values 242, 244. The predictive model of the target group may be constructed by the analysis server 114 using the deviation value generator 240. The system may be configured to store the predictive model of the target group using the database 116 and provide inquirer access to the stored predictive model of the target group.

In the depicted implementation, the example method 1000 continues by using the predictive model of the target group constructed using only the responses received from the target group during the second feedback session to measure accuracy of the first group's predictions received during the first feedback session (step 1012). In the depicted implementation the accuracy of the predicting group's predictions received during the first feedback session may be measured using deviations determined as a function of a comparison value calculated from the responses received from the target group during the second feedback session. The accuracy of the predicting group's predictions of the target group's answers represent how intensely a user in the predicting group focused on the target group while the user in the first group also focused on the content to answer a question about the content from the perspective of the target group. The predicting group user's level of intensity focusing on the target group correlates with the predicting group user's level of intensity focusing on the content. The predictions by the users of the predicting group that most accurately predicted the target group's responses may be selected as predictions from the users of the predicting group that focused most intensely on the content and which selected predictions and users are most useful to providing access to more accurate market research.

In the depicted implementation, the example method 1000 continues by providing inquirer access to the predictive model of the target group and at least a portion of the most accurate of the predicting group's predictions, for measuring content item effect based on the predictive analytics directed to the at least one question during the first and second feedback sessions and to the predictions during the first feedback session (step 1014).

Although various features have been described with reference to the Figures, other features are possible.

Various implementations designed in accordance with the present disclosure may improve the accuracy of market research results provided to an inquirer, such as but not limited to a content provider, social media influencer, advertiser, politician, pollster, or publisher. Such improved market research results accuracy may be a result of providing an inquirer market research results from responders that focused most intensely on the content when giving their answers about the content. Such market research from responders that focused most intensely on the content when giving their answers about the content may be more accurate market research, improving an inquirer's efficiency of budget utilization and limiting exposure to wasted advertising funds that might have been spent on less effective content.

An implementation in accordance with the present disclosure may be configured for providing inquirers access to market research from users that most intensely focused on content, based on measuring accuracy of a first group's predictions of answers from a target group distinct and excluded from the first group, for the same content and question about the content, selecting as most intensely focused the first group users that most accurately predicted the target group member's answers, and providing an advertiser with access to market research results from the most intensely focused users of the first group. Providing an advertiser with access to market research from the users most intensely focused on the content may be a result of using a predictive model of the target group to measure the accuracy of the first group's predictions of the target group's answers, as a proxy for measuring how intensely the first group users focused on the content. The predictive model of the target group may be refined based on removing one or more outlier from data used to construct the predictive model, to improve accuracy of measuring the first group's predictions using the predictive model.

The accuracy of the first group's predictions of the target group's answers represent how intensely a user in the first group focused on the target group while the user in the first group also focused on the content to answer a question about the content from the perspective of the target group. The first group user's level of intensity focusing on the target group correlates with the first group user's level of intensity focusing on the content. An implementation in accordance with the present disclosure may measure the accuracy of the first group's predictions of the target group's answers by presenting the same content and question about the content to the first group and the target group, determining the first group's predictions of the target group's responses, determining the target group's responses, constructing a predictive model of the target group comprising a comparison value for the target group's responses, using the predictive model of the target group to evaluate the accuracy of the first group's predictions based on deviations of the first group's predictions from the comparison value determined for the target group's responses, and identifying those predictions of the first group that predicted the target group's responses most accurately. The predictions by the users of the first group that most accurately predicted the target group's responses may be selected as predictions from the users of the first group that focused most intensely on the content and which selected predictions and users are most useful to providing access to more accurate market research.

The first group and the target group may be distinct and exclusive from each other as a result of selection criteria distinguishing the first group from the target group. The selection criteria distinguishing the first group from the target group may be criteria chosen using a selection and targeting interface. The criteria distinguishing the first group and the target group may comprise demographic criteria such as, for example, location, gender, age, occupation, education, or any other useful selection and targeting criteria as may be known by one of ordinary skill in the pertinent art. The distinct groups may be selected based on criteria chosen so that no user of the first group would be a member of the target group. The users of the first group may be presented, via a user interface, with a description of criteria identifying the target group, to enable the first group to focus on the target group based on the criteria.

Content may be selectively presented to the first group and target group such that no selected member of the target group will have been presented with the content when the first group's predictions for the target group's answers are received. For example, account records that identify content that has been shown to particular responders may be used to automatically select responders that have not yet been presented with particular content. The first group may be specifically requested via a user interface to give a response representing the users' predictions of how a member of the target group might respond to the content item in the future. The first group or the target group may be specifically requested via a user interface to provide a response directed to their own response to the question regarding a content item. The first group may be presented with a user interface comprising a distinct user selectable indication that the response provided is the user's prediction of how a member of the target group will respond in the future. The predictions may be received by a processor with the user selected indication that the answer provided is the user's prediction of how a member of the target group will respond in the future. The first group may be presented with a user interface comprising a distinct user selectable indication that the response provided is directed to the first group user's own response to the question regarding a content item. The target group may be presented with a user interface comprising a distinct user selectable indication that the response provided is directed to the target group member's own response to one or more question regarding a content item. The response may be received by a processor with the user selected indication that the response provided is directed to the responder's own response to one or more question regarding a content item.

The first group and the target group may be presented with a user interface comprising a user selectable indication of the degree of difference between the responder's response and the response of an average user in their own group as selected by the implementation. The selection and targeting interface may be configured to select only users of the first group that are separated by a minimum distance or a maximum distance. The selection and targeting interface may be configured to select only members of the target group that are spatially separated by a minimum distance or a maximum distance. User location information based on sensor systems such as, for example, Global Positioning System (GPS) may be used by a processor to determine a minimum or maximum separation distance for selecting users. For example, the minimum distance or maximum distance may be any useful distance. The selection and targeting interface may be configured to select a minimum number or maximum number of users of the first group. The selection and targeting interface may be configured to select a minimum number or maximum number of members of the target group.

Some implementations may treat as an outlier one or more response from a user indicating their answer might deviate substantially from an average user of their own group, or from the majority of their own group. Such an answer from a user indicating their answer might deviate substantially from an average user of their own group may be removed before determining a comparison value. An implementation may be configured to identify as an outlier one or more answer or prediction that deviates more than a predetermined percentage from a comparison value. Such an outlier answer or prediction that deviates more than a predetermined percentage from a comparison value may be removed and a subsequent comparison value determined that does not take into account such outlier. Such a refined or purified comparison value may increase the usefulness of accuracy measurements in line with what has been discussed herein.

In an illustrative example, an implementation may be configured to select as a target group those users of a population that provided responses having deviations within the range of deviations of the responses provided by the majority of the population. In this example implementation the majority group may be identified by responses comprising a majority range of answer values, and the non-majority may be identified by responses comprising a non-majority range of answer values. In some scenarios, a non-majority range of answer values may not overlap a majority range of answer values. Continuing this example, the sense of the majority and non-majority ranges may be reversed. For example, the target group may be selected as a non-majority group, and the predicting group may be the non-majority. An exemplary method may construct a predictive model of a target group based on responses from the target group, use the predictive model to measure the accuracy of a predicting group's predictions of the target group's responses, and provide an inquirer access to the predictive model and the most accurate of the predicting group's predictions of the target group's responses, to generate predictive analytic content effectiveness output determined as a function of content item input.

An implementation in accordance with the present disclosure may be configured to provide Market Research with more accurate results, based on a new survey method disclosed and claimed herein. An implementation in accordance with the present disclosure may be referred to as RAADZ. An implementation of RAADZ may encourage respondents to provide more thoughtful responses. Questions may be answered by predicting the average response from all responses, and responses may be selected for market research based on the degree of thoughtfulness. RAADZ may ask users to respond providing an average response of selected others, instead of their own response. RAADZ may ask users to respond predicting the responses of a distinct and separate target group, instead of their own response.

In an illustrative example, an implementation of the RAADZ Methodology may be designed to focus on providing the response of the majority vs. the individual respondent, or one group's prediction of what another group's response about the same content will be in the future. In an illustrative example, the RAADZ Methodology focuses on leveraging the False Consensus Effect. In psychology, the false consensus effect, also known as consensus bias, is a pervasive cognitive bias that causes people to "see their own behavioral choices and judgments as relatively common and appropriate to existing circumstances." In an illustrative example, the RAADZ method may ask respondents to predict the average response from all respondents, providing a way to grade/evaluate responses that are closest. Grading/evaluating responses that are closest to an average response from all respondents or most accurately predict responses from a separate and distinct responding target group may provide more accurate market research as a result of limiting or mitigating effects of Social Desirability Bias. Social Desirability Bias is a type of response bias that is the tendency of survey respondents to answer questions in a manner that will be viewed favorably by others, taking the form of over-reporting "good behavior" or under-reporting "bad", or undesirable behavior, which may pose a serious problem by interfering with the interpretation of average tendencies as well as individual differences. In an illustrative example, the RAADZ method is particularly effective for topics that are controversial, as a result of mitigating effects of Social Desirability Bias and/or the False Consensus Effect.

In an illustrative example, consider a local business wants to build a park in a selected neighborhood to increase foot traffic to his local business and advertises for doing so in the selected neighborhood. To create the most effective advertising for building the park and using an implementation in accordance with the present disclosure, the business/advertiser would ask each person in the neighborhood not what they personally think of the advertisement for building the park in the neighborhood but what each individual thinks the other neighbors (users) in the neighborhood think of the advertisement for building the park. No one person could determine in their mind what each individual user thinks the plurality of neighbors (users) will think of the advertisement and respond. The personal favorable rating of the person predicting what their neighbors think may be different from what they personally think of the advertisement, perhaps as a result of False Consensus Effect and/or Social Desirability Bias. Accordingly, no individual could measure in their mind the cumulative responses of what individual users think the neighbors' responses to the advertisement will be, nor provide a measurement and subsequent ranking of those responses and limit or mitigate False Consensus Effect and/or Social Desirability Bias, to provide more accurate market research.

In illustrative examples, an exemplary RAADZ implementation may be configured with a unique platform design enabling quick and easy set-up and deployment through intuitive/non-technical content and question creation screens. An exemplary RAADZ implementation may be configured with a simple respondent user interface designed to be quick and easy to use when responding to questions, eliminating fatigue associated with other platforms. In some scenarios an exemplary RAADZ implementation may be configured with an on demand RAADZ respondent pool permitting access to RAADZ respondents willing to participate in a variety of scenarios. An exemplary RAADZ implementation may be deployed using a RAADZ App configurable in an Android or iOS platform environment to provide easy access to new available content and questions when respondents are on the go, for example, a respondent may be able to provide a response using RAADZ while waiting in line to get coffee.

In an aspect, an exemplary method may comprise receiving a content item from an inquirer, using a processor; presenting the content item in a first feedback session to a predicting group comprising a first plurality of users distinct from members of a responding target group, said content item comprising at least one question directed to the users' own responses concerning the content item and a request for each user of the predicting group to provide a prediction of how a member of the target group will respond to the content item if members of the target group were presented the content item in the future, using the processor, wherein the users and the target group members are selected by selection and targeting criteria so that no user of the predicting group is a member of the responding target group, receiving, from the first plurality of users, a first plurality of responses to the at least one question and prediction, using the processor; determining a first predictive model comprising a first comparison value based on a statistic calculated from the first plurality of responses, using the processor; determining a first plurality of deviation values in the first predictive model, wherein each deviation value of the first plurality of deviation values is respectively a deviation between each response of the first plurality of responses and the first comparison value, using the processor; sorting the first plurality of responses according to the respective first plurality of deviation values, wherein a lower position in the sorted first plurality of responses corresponds to a lower deviation value, using the processor; and providing the inquirer access to the first predictive model and at least a portion of the sorted first plurality of responses selected as a function of the first comparison value, using the processor, to measure content item effect based on the responses to the at least one question and the predictions, using the processor.

The first plurality of responses may only comprise a plurality of responses directed to the users' own responses concerning the content item, wherein the responses are received with a plurality of user selected indications that the responses are the user's own responses, using the processor, and wherein the method further comprises: determining a second predictive model comprising a second comparison value based on a statistic calculated from the plurality of responses directed to the users' own responses concerning the content item, using the processor; determining a second plurality of deviation values in the second predictive model, wherein each deviation value of the second plurality of deviation values is respectively a deviation between the second comparison value and each response of the plurality of responses directed to the users' own responses concerning the content item, using the processor; sorting the first plurality of responses according to the respective second plurality of deviation values, wherein a lower position in the sorted first plurality of responses corresponds to a lower deviation value, using the processor; and providing the inquirer access to the second predictive model and at least a portion of the sorted first plurality of responses selected as a function of the second comparison value, using the processor, to measure content item effect based on the responses to the at least one question using the processor.

The first plurality of responses may only comprise a plurality of responses representing the users' predictions of how a member of the target group will respond to the content item in the future, wherein the responses are received with a plurality of user selected indications that the responses are the user's predictions of how a member of the target group will respond in the future, using the processor, and wherein the method further comprises: determining a third predictive model comprising a third comparison value based on a statistic calculated from the plurality of responses representing the users' predictions of how a member of the target group will respond to the content item in the future, using the processor; determining a third plurality of deviation values in the third predictive model, wherein each deviation value of the third plurality of deviation values is respectively a deviation between the third comparison value and each response of the plurality of responses representing the users' predictions of how a member of the target group will respond to the content item in the future, using the processor; sorting the first plurality of responses according to the respective third plurality of deviation values, wherein a lower position in the sorted first plurality of responses corresponds to a lower deviation value, using the processor; and providing the inquirer access to the third predictive model and at least a portion of the sorted first plurality of responses selected as a function of the third comparison value, using the processor, to measure content item effect based on the predictions, using the processor.

The method may further comprise presenting the content item and the at least one question to a plurality of selected members of the target group during a second feedback session with a request for each member of the target group to provide a response representing their own response concerning the content item, using the processor; receiving, from the plurality of selected members of the target group during the second feedback session, a second plurality of responses to the at least one question, using the processor, wherein the responses are received with a plurality of member selected indications that the responses are the member's own responses; determining a fourth predictive model comprising a fourth comparison value based on a statistic calculated from the second plurality of responses, using the processor; and providing the inquirer access to the fourth predictive model to measure content item effect based on the responses to the at least one question during the second feedback session, using the processor.

The method may further comprise determining a fourth plurality of deviation values in the fourth predictive model, wherein each deviation value of the fourth plurality of deviation values is respectively a deviation between the fourth comparison value and each response of the plurality of responses representing the users' predictions of how a member of the responding target group will respond to the content item in the future, using the processor, wherein the predictions were received from users of the predicting group during the first feedback session; sorting the plurality of predictions received from users of the predicting group during the first feedback session according to the respective fourth plurality of deviation values, wherein a lower position in the sorted plurality of predictions corresponds to a lower deviation value, using the processor; and providing the inquirer access to at least a portion of the sorted plurality of predictions selected as a function of the fourth comparison value, using the processor, to measure content item effect based on the responses to the at least one question during the first and second feedback sessions and the predictions during the first feedback session, using the processor.

The method may further comprise providing the inquirer access to a portion of the sorted plurality of predictions that have respective deviations not greater than a predetermined percentage deviation from the fourth comparison value, using the processor.

The predetermined percentage deviation may be received from the inquirer.

The predetermined percentage deviation may be in a range of ten to twenty-five percent.

The content item may be selected by the inquirer from a plurality of content items.

The statistic may further comprise an average, median, or mode.

Each deviation value may be a difference between the respective response and the first comparison value.

The first comparison value may be calculated when a feedback period concludes, using the processor.

The method may further comprise concluding a feedback period when a predetermined number of responses have been received, using the processor.

The method may further comprise concluding a feedback period when a selected user moves beyond a predetermined radius of a selected location, as determined by the processor as a function of sensor data received by the processor.

The content item may further comprise an advertisement, a poll, a political question, a song, a lyric, a video, an image, a sound, a portion of text, a movie, a book, a title, a product design, or a logo.

The predicting group may be selected based on a location distinct from a location of the target group, using the processor.

The predicting group may be selected based on a gender distinct from a gender of the target group, using the processor.

In another aspect an exemplary method may comprise receiving a content item from an inquirer, using a processor, wherein the content item is selected by the inquirer from a plurality of content items; presenting the content item and at least one question from the inquirer to a responding target group with a request to provide a plurality of individual responses representing the respective responses of each individual in the target group, using the processor; receiving the plurality of responses from the target group, using the processor; determining a first predictive model comprising a first comparison value based on the plurality of responses received from the target group, using the processor; presenting the content item and the at least one question to a distinct and separate predicting group with a request to provide a plurality of individual predictions by the individuals in the predicting group of how a member of the target group might respond to the at least one question, using the processor; receiving the plurality of predictions from the predicting group, using the processor; determining a second comparison value based on the plurality of predictions from the predicting group, using the processor; using the first predictive model to evaluate accuracy of the predicting group predictions, using the processor; and providing the inquirer access to at least a portion of the predicting group predictions selected as a function of the first predictive model, using the processor, to measure content item effect based on the responses directed to the at least one question and to the predictions.

The at least a portion of the predicting group predictions may have respective deviations not greater than a predetermined percentage deviation from the first comparison value.

The inquirer may be an advertiser, social media influencer, pollster, or politician.

The responding target group may be selected so that no member of the responding target group has previously been presented the content item.

The method may further comprise providing the inquirer access to the first predictive model, using the processor, to predict content item effect based on the responses directed to the at least one question and to the predictions.

The method may further comprise providing the inquirer access to the first predictive model, using the processor, to predict content item effect based on the users associated with the at least a portion of the predicting group predictions.

CONCLUSION

Without further elaboration, it is believed that one skilled in the art can use the preceding description to utilize the claimed inventions to their fullest extent. The examples and embodiments disclosed herein are to be construed as merely illustrative and not a limitation of the scope of the present disclosure in any way. It will be apparent to those having skill in the art that changes may be made to the details of the above-described embodiments without departing from the underlying principles discussed. In other words, various modifications and improvements of the embodiments specifically disclosed in the description above are within the scope of the appended claims. For example, any suitable combination of features of the various embodiments described is contemplated. The scope of the invention is therefore defined by the following claims.

All of the disclosed methods and procedures described in this disclosure can be implemented using one or more computer programs or components. These components may be provided as a series of computer instructions on any conventional computer readable medium or machine readable medium, including volatile and non-volatile memory, such as RAM, ROM, flash memory, magnetic or optical disks, optical memory, or other storage media. The instructions may be provided as software or firmware, and may be implemented in whole or in part in hardware components such as ASICs, FPGAs, DSPs, or any other similar devices. The instructions may be configured to be executed by one or more processors, which when executing the series of computer instructions, performs or facilitates the performance of all or part of the disclosed methods and procedures.

It should be understood that various changes and modifications to the examples described here will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A method comprising:

receiving a content item from an inquirer, using a processor;

deploying a mobile app to a plurality of devices associated with a plurality of users;

placing the content item on an advertising web platform comprising an inquirer platform interface, using the processor, said inquirer platform interface comprising a selection and targeting interface configured to permit the inquirer to select from the plurality of users a predicting group comprising predicting group users, a predicting group location, gender, and age, a minimum number or maximum number of the predicting group users and a predetermined radius for a selected location corresponding to the predicting group users;

said selection and targeting interface further configured to permit the inquirer to select, from the plurality of users, target group members of a responding target group, a target group location, gender, and age, a minimum number or maximum number of the target group members and a predetermined radius for a selected location corresponding to the target group members, wherein at least one member of the target group members has a location, gender, or age distinct from the predicting group location, gender and age and no user of the predicting group users is a member of the target group members;

receiving user location information for the predicting group users and the target group members based on GPS sensor data from the devices of the predicting group users and the target group members, using the processor;

initiating a first feedback session to the predicting group users within the predetermined radius based on the GPS sensor data from the devices of the predicting group users, so that the predicting group users can submit predictions, presenting the content item in the first feedback session to the predicting group users, using a plurality of content user interfaces, a plurality of answer interfaces operable in a plurality of displays configured in the deployed mobile app of the devices of the predicting group users, wherein each content user interface comprises a plurality of user operable content display controls comprising: a volume scale, pause button, play button, and full size button configured to make the content item fit the content interface display, wherein each answer interface of the plurality of answer interfaces is inoperable until a predicting group user of the predicting group users completes viewing the content item presented in the content user interface, said content item comprising at least one question directed to the predicting group users own responses concerning the content item and a requirement for each of the predicting group users to provide a prediction of how a member of the target group members will respond to the content item if the target group members are presented the content item in the future, using the processor, wherein the selection and targeting interface is further configured to ensure that no selected member of the target group members will have been previously presented with the content when the predicting group users' predictions are received by the processor, presenting, to the predicting group users via the content user interface, the target group location, gender and age, using the processor;

receiving, from the predicting group users, a first plurality of responses in the plurality of answer interfaces to the at least one question and prediction, using the processor, wherein each of the first plurality of responses received by the processor comprise a user selected indication, from a user of predicting group users, a prediction of how a member of the target group members will respond in the future to the at least one question concerning the content item, and wherein each answer interface of the plurality of answer interfaces is configured to receive a response comprising at least one of: a bubble response selected from a plurality of bubble responses, a check box response selected from a plurality of checkbox responses, one or more sliding scale response, a response selected from a plurality of predetermined responses, or a fill in or type in response;

concluding the first feedback session so that individual users of the predicting group users can no longer submit predictions if the individual users of the predicting group users moves beyond the predetermined radius, using the processor and the GPS sensor data from the devices of the predicting group users, otherwise, continuing the first feedback session, comprising:

determining a first predictive model comprising a first comparison value calculated from the first plurality of responses, using the processor;

determining a first plurality of deviation values in the first predictive model, wherein each deviation value of the first plurality of deviation values is respectively a deviation between each response of the first plurality of responses and the first comparison value, using the processor;

sorting and storing in a database operably coupled with an analysis server operably coupled to the inquirer platform interface, the first plurality of responses according to the respective first plurality of deviation values, wherein a lower position in the sorted first plurality of responses corresponds to a lower deviation value, using the processor; and using the inquirer platform interface to provide the inquirer the stored data for the inquirer to measure content item effect.

2. The method of claim 1, wherein the first plurality of responses only comprises a plurality of responses directed to the predicting group users' own responses concerning the content item, wherein the responses are received with a plurality of user selected indications that the responses are the predicting group user's own responses, using the processor, and wherein the method further comprises:

determining a second predictive model comprising a second comparison value calculated from the plurality of responses directed to the predicting group users' own responses concerning the content item, using the processor;

determining a second plurality of deviation values in the second predictive model, wherein each deviation value of the second plurality of deviation values is respectively a deviation between the second comparison value and each response of the plurality of responses directed to the predicting group users' own responses concerning the content item, using the processor;

sorting the first plurality of responses according to the respective second plurality of deviation values, wherein a lower position in the sorted first plurality of responses corresponds to a lower deviation value, using the processor; and providing the inquirer access to the second predictive model and at least a portion of the sorted first plurality of responses selected as a function of the second comparison value, using the processor, to measure content item effect based on the responses to the at least one question using the processor.

3. The method of claim 1, wherein the first plurality of responses only comprises a plurality of responses representing the predicting group users' prediction of how a member of the target group members will respond to the content item in the future, wherein the responses are received with a plurality of user selected indications that the responses are the predicting group user's prediction of how a member of the target group members will respond in the future, using the processor, and wherein the method further comprises:

determining a third predictive model comprising a third comparison value calculated from the plurality of responses representing the predicting group users' prediction of how a member of the target group members will respond to the content item in the future, using the processor;

determining a third plurality of deviation values in the third predictive model, wherein each deviation value of the third plurality of deviation values is respectively a deviation between the third comparison value and each response of the plurality of responses representing the predicting group users' prediction of how a member of the target group members will respond to the content item in the future, using the processor;

sorting the first plurality of responses according to the respective third plurality of deviation values, wherein a lower position in the sorted first plurality of responses corresponds to a lower deviation value, using the processor; and providing the inquirer access to the third predictive model and at least a portion of the sorted first plurality of responses selected as a function of the third comparison value, using the processor, to measure content item effect based on the prediction, using the processor.

4. The method of claim 3, wherein the method further comprises:

presenting the content item and the at least one question to a plurality of selected members of the target group members during a second feedback session with a requirement for each member of the target group members to provide a response representing their own response concerning the content item, using the processor;

receiving, from the plurality of selected members of the target group members during the second feedback session, a second plurality of responses to the at least one question, using the processor, wherein the responses are received with a plurality of member selected indications that the responses are a member's, of the target group members, own responses;

determining a fourth predictive model comprising a fourth comparison value calculated from the second plurality of responses, using the processor; and providing the inquirer access to the fourth predictive model to measure content item effect based on the responses to the at least one question during the second feedback session, using the processor.

5. The method of claim 4, wherein the method further comprises:

determining a fourth plurality of deviation values in the fourth predictive model, wherein each deviation value of the fourth plurality of deviation values is respectively a deviation between the fourth comparison value and each response of the plurality of responses representing the users' prediction of how a member of the responding target group members will respond to the content item in the future, using the processor, wherein the prediction were received from users of the predicting group during the first feedback session;

sorting the plurality of prediction received from users of the predicting group during the first feedback session according to the respective fourth plurality of deviation values, wherein a lower position in the sorted plurality of prediction corresponds to a lower deviation value, using the processor; and providing the inquirer access to at least a portion of the sorted plurality of prediction selected as a function of the fourth comparison value, using the processor, to measure content item effect based on the responses to the at least one question during the first and second feedback sessions and the prediction during the first feedback session, using the processor.

6. The method of claim 5, wherein the method further comprises providing the inquirer access to a portion of the sorted plurality of prediction that have respective deviations not greater than a predetermined percentage deviation from the fourth comparison value, using the processor.

7. The method of claim 6, wherein the predetermined percentage deviation is received from the inquirer.

8. The method of claim 6, wherein the predetermined percentage deviation is in a range of ten to twenty-five percent.

9. The method of claim 1, wherein the content item is selected by the inquirer from a plurality of content items.

10. The method of claim 1, wherein the first comparison value further comprises an average, median, or mode.

11. The method of claim 1, wherein each deviation value is a difference between the first plurality of responses and the first comparison value.

12. The method of claim 1, wherein the first comparison value is calculated when a feedback period concludes, using the processor.

13. The method of claim 1, wherein the method further comprises concluding a feedback period when a predetermined number of responses have been received, using the processor.

14. The method of claim 1, wherein the content item further comprises an advertisement, a poll, a political question, a song, a lyric, a video, an image, a sound, a portion of text, a movie, a book, a title, a product design, or a logo.

15. The method of claim 1, wherein the predicting group users are selected based on a location distinct from a location of the target group members, using the processor.

16. The method of claim 1, wherein the predicting group users are selected based on a gender distinct from a gender of the target group members, using the processor.

17. The method of claim 1, wherein the method further comprises receiving an indication via a user interface from at least one responding target group member of the target group members that the respective response received from the at least one responding target group member might deviate substantially from an average response of a majority of the target group members, using the processor, wherein determining the first predictive model further comprises calculating the first comparison value when a predetermined number of responses from the target group members have been received, using the processor, and wherein calculating the first comparison value further comprises removing the at least one responding target group member's response from the plurality of responses from the target group members before calculating the first comparison value.

* * * * *